United States Patent
Fujiwaka

(10) Patent No.: US 12,548,246 B2
(45) Date of Patent: Feb. 10, 2026

(54) INFORMATION PROCESSING APPARATUS, INFORMATION PROCESSING METHOD, AND RECORDING MEDIUM FOR ESTIMATING A POSITION AND POSTURE OF A TARGET OBJECT USING AN EXTENDED THREE-DIMENSIONAL MODEL

(71) Applicant: NEC Corporation, Tokyo (JP)

(72) Inventor: Masaya Fujiwaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 308 days.

(21) Appl. No.: 18/195,718

(22) Filed: May 10, 2023

(65) Prior Publication Data

US 2023/0368462 A1 Nov. 16, 2023

(30) Foreign Application Priority Data

May 12, 2022 (JP) ................... 2022-078929

(51) Int. Cl.
*G06T 17/00* (2006.01)
*G06T 7/70* (2017.01)

(52) U.S. Cl.
CPC ............... *G06T 17/00* (2013.01); *G06T 7/70* (2017.01)

(58) Field of Classification Search
CPC . G06T 7/70; G06T 17/00; G06T 2207/10028; G06T 2207/20096; G06T 2207/30252; G06T 7/75
See application file for complete search history.

(56) References Cited

U.S. PATENT DOCUMENTS 9,189,886 B2 * 11/2015 Black ................. G06Q 30/0601
10,839,586 B1 * 11/2020 Nemchinov ............ G06T 3/067
(Continued)

FOREIGN PATENT DOCUMENTS

JP  2011-238105 A  11/2011
JP  2012-042396 A   3/2012
(Continued)

OTHER PUBLICATIONS

Simon et al., Real-time 3-D Pose Estimation Using a High-Speed Range Sensor, 1994 (Year: 1994).*
(Continued)

*Primary Examiner* — Phong X Nguyen
(74) *Attorney, Agent, or Firm* — Sughrue Mion, PLLC

(57) ABSTRACT

To realize a technique for estimating the position and posture of a target object without preparing a large number of three-dimensional models, an information processing apparatus (1) includes: an obtaining section (11) that obtains sensing data obtained by a sensor of which a sensing range includes a target object therein; an estimating section (12) that derives one or more candidate solutions to the position and posture of the target object by a first estimating process in which the sensing data obtained by the obtaining section (11) and a three-dimensional model are used; and an extending section (13) that extends the three-dimensional model with respect to each of the one or more candidate solutions, the estimating section (12) estimating the position and posture of the target object by a second estimating process in which one or more extended three-dimensional models obtained by the extending section (13) are used.

10 Claims, 14 Drawing Sheets

(56) References Cited

U.S. PATENT DOCUMENTS

| | | | |
|---|---|---|---|
| 2008/0228434 A1* | 9/2008 | Aratani | G06T 7/70 |
| | | | 702/150 |
| 2016/0071318 A1* | 3/2016 | Lee | G06V 20/653 |
| | | | 345/419 |
| 2017/0169581 A1* | 6/2017 | Yamada | G06T 7/73 |
| 2019/0108679 A1* | 4/2019 | Wang | G06T 7/344 |
| 2019/0362551 A1* | 11/2019 | Sheffield | G06T 17/205 |
| 2021/0272315 A1* | 9/2021 | Kawamoto | E02F 9/261 |
| 2022/0101552 A1* | 3/2022 | Kawamoto | G06T 7/11 |
| 2022/0215564 A1* | 7/2022 | Sunarjo | G06T 19/20 |
| 2022/0392251 A1* | 12/2022 | Zhang | G06T 19/20 |
| 2023/0368462 A1* | 11/2023 | Fujiwaka | G06T 7/75 |

FOREIGN PATENT DOCUMENTS

| | | | |
|---|---|---|---|
| JP | 2020-034527 A | 3/2020 | |
| JP | 2020-126363 A | 8/2020 | |

OTHER PUBLICATIONS

Stoll et al., Template Deformation for Point Cloud Fitting, 2006 (Year: 2006).*

* cited by examiner

FIG. 11
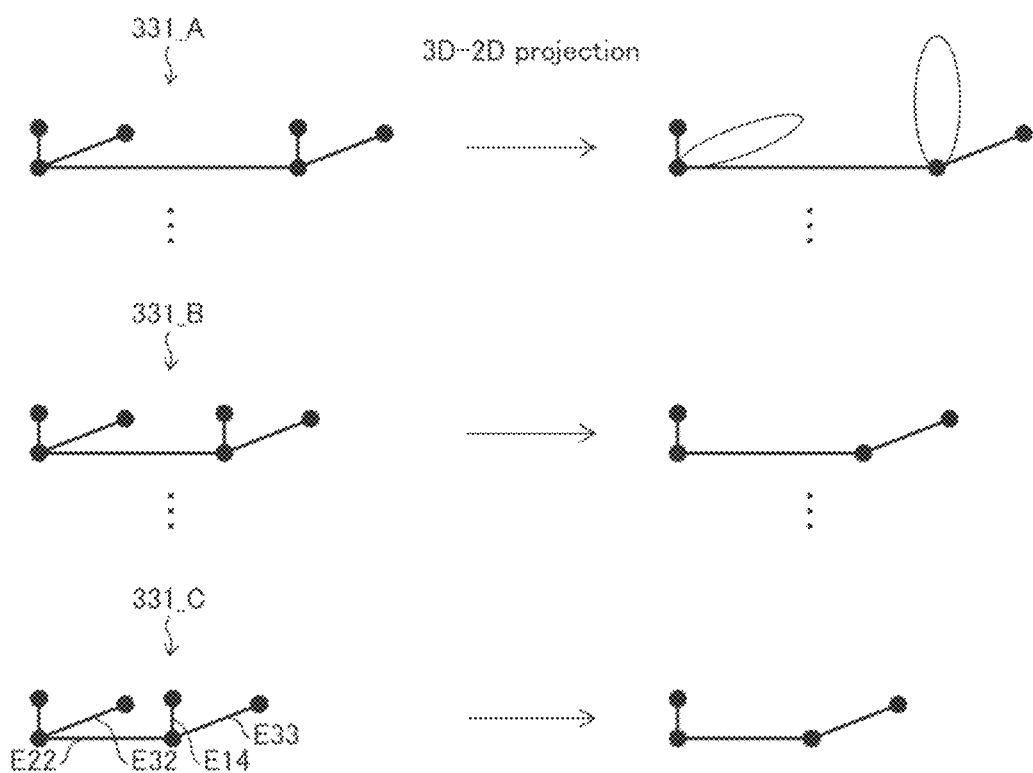
FIG. 12
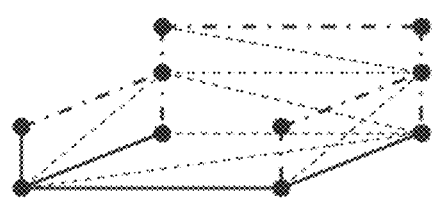
3D-2D projection
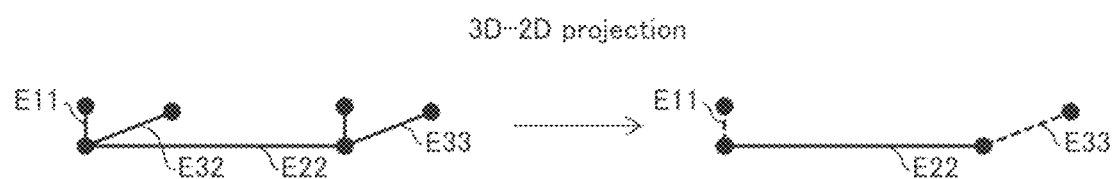

FIG. 17
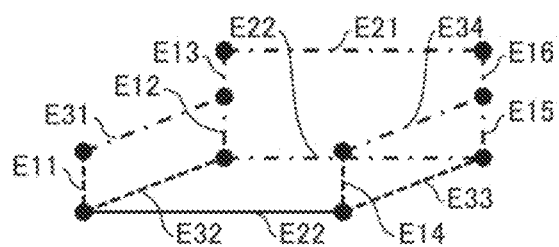
FIG. 18
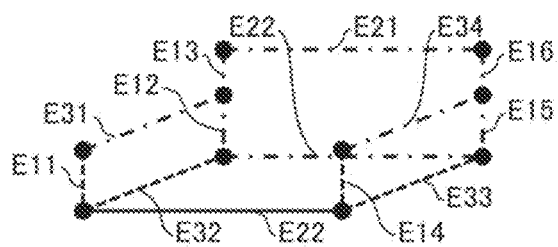
When group of edges E11, E12, E14, and E15 is selected
When group of edges E31, E32, E33, and E34 is selected
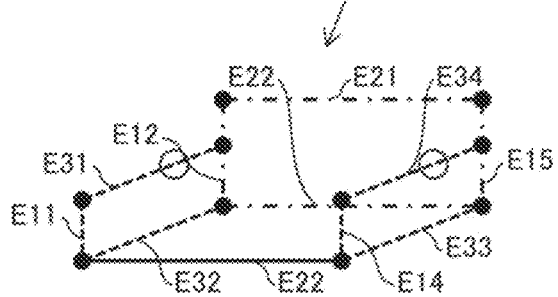
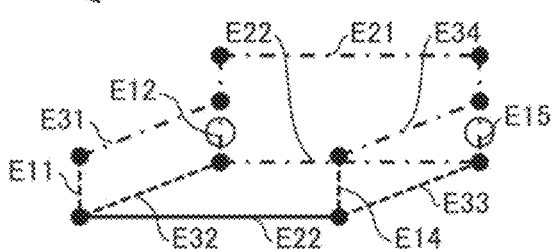

INFORMATION PROCESSING APPARATUS, INFORMATION PROCESSING METHOD, AND RECORDING MEDIUM FOR ESTIMATING A POSITION AND POSTURE OF A TARGET OBJECT USING AN EXTENDED THREE-DIMENSIONAL MODEL This application is based upon and claims the benefit of priority from Japanese patent application No. 2022-078929, filed on May 12, 2022, the disclosure of which is incorporated herein in its entirety by reference.

TECHNICAL FIELD

The present invention relates to an information processing apparatus, an information processing method, and a recording medium, each of which is for estimating the position and the posture of a target object.

BACKGROUND ART

There is known a technique of estimating the position and the posture of a target object in a real space by analyzing a captured image of the target object included in an angle of view. As a technique of determining the positions and the types of different components (workpieces) in a line in which a variety of components are handled, Patent Document 1, for example, discloses preparing a three-dimensional model for each type and comparing (i) two-dimensional image data obtained by capturing an image of the three-dimensional model and (ii) an actual image captured by a camera.

CITATION LIST

Patent Literature

Patent Literature 1

Japanese Patent Application Publication Tokukai No. 2011-238105

SUMMARY OF INVENTION

Technical Problem

However, the technique disclosed in Patent Document 1 has the problem that individual types of precise three-dimensional models need to be prepared and the problem that, as the number of types increases, a calculation cost and a calculation time increase.

An example aspect of the present invention has been made in view of the above problems, and an example object thereof is to provide a technique which makes it possible to estimate the position and the posture of a target object without preparing a large number of three-dimensional models.

Solution to Problem

An information processing apparatus according to an example aspect of the present invention includes: at least one processor, the at least one processor carrying out: an obtaining process of obtaining sensing data that has been obtained by a sensor of which a sensing range includes a target object therein; a first estimating process of deriving one or more candidate solutions to a position and a posture of the target object with use of the sensing data that has been obtained in the obtaining process and a three-dimensional model; an extending process of extending the three-dimensional model with respect to each of the one or more candidate solutions; and a second estimating process of estimating the position and the posture of the target object with use of one or more extended three-dimensional models that have been obtained in the extending process.

An information processing method according to an example aspect of the present invention includes: (a) obtaining sensing data that has been obtained by a sensor of which a sensing range includes a target object therein; (b) deriving one or more candidate solutions to a position and a posture of the target object by a first estimating process in which the sensing data and a three-dimensional model are used; (c) extending the three-dimensional model with respect to each of the one or more candidate solutions; and (d) estimating the position and the posture of the target object by a second estimating process in which one or more extended three-dimensional models are used, the steps (a) through (d) being carried out by at least one processor.

A non-transitory recording medium according to an example aspect of the present invention is a non-transitory recording medium in which a program is recorded, the program causing a computer to carry out: an obtaining process of obtaining sensing data that has been obtained by a sensor of which a sensing range includes a target object therein; a first estimating process of deriving one or more candidate solutions to a position and a posture of the target object with use of the sensing data that has been obtained in the obtaining process and a three-dimensional model; an extending process of extending the three-dimensional model with respect to each of the one or more candidate solutions; and a second estimating process of estimating the position and the posture of the target object with use of one or more extended three-dimensional models that have been obtained in the extending process.

Advantageous Effects of Invention

In an example aspect of the present invention, it is possible to estimate the position and the posture of a target object without preparing a large number of three-dimensional models.

BRIEF DESCRIPTION OF DRAWINGS

FIG. 11 is a drawing illustrating an example in which 3D models are each mapped onto a two-dimensional space.

FIG. 12 is a drawing illustrating an example in which a 3D model is mapped onto a two-dimensional space.

FIG. 17 is a drawing illustrating grouping of edges.

FIG. 18 is a drawing illustrating grouping of edges.

DESCRIPTION OF EMBODIMENTS

First Example Embodiment

The following description will discuss, in detail, a first example embodiment of the present invention with reference to drawings. The first example embodiment is made the basis of an example embodiment described later.
(Configuration of Information Processing Apparatus 1)

Figure 1:
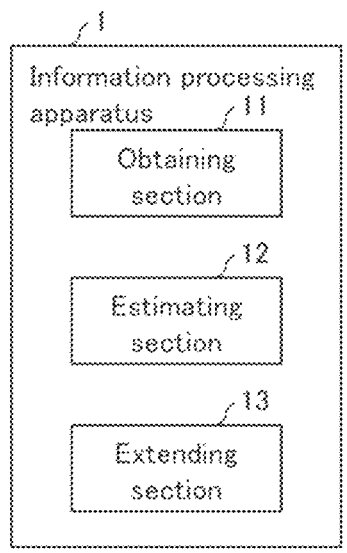
FIG. 1 is a block diagram illustrating a configuration of an information processing apparatus according to a first example embodiment.

A configuration of an information processing apparatus 1 according to the first example embodiment is described with reference to FIG. 1. FIG. 1 is a block diagram illustrating the configuration of the information processing apparatus 1 according to the first example embodiment. The information processing apparatus 1 derives one or more candidate solutions to the position and the posture of a target object, with use of (i) sensing data that has been obtained by a sensor of which a sensing range includes the target object therein and (ii) a three-dimensional model.

The target object is a target of estimation of a position and a posture. Examples of the target object include, but are not limited to, a vessel (cargo bed) of a dump truck and a box having an interior which is surrounded by an edge and in which an object can be accommodated.

The information processing apparatus 1 is widely applicable to one or more automatic guided vehicles (AGVs), construction machines, self-drive vehicles, monitoring systems, and the like. For example, the information processing apparatus 1 can be used in a system which is for a work site where earth and sand excavated by a backhoe is loaded onto a vessel of a dump truck and which estimates at least one of the position and the posture of the vessel, as a target object, of the dump truck and causes the earth and sand to be loaded onto the vessel with reference to the at least one of the position and the posture that has been estimated.

The sensor includes, for example, a depth sensor or an imaging sensor. Examples of the depth sensor include, but are not limited to, a stereo camera; and light detection and ranging (LiDAR). The stereo camera includes a plurality of cameras, and determines a distance (depth) to a target object by parallax between the plurality of cameras. The LiDAR measures a distance (depth) to a target object with use of a laser. The sensing data obtained by the sensor includes, for example, depth information or a captured image. Examples of the depth information include a depth image and coordinate data. The depth image represents a depth obtained by the stereo camera. The coordinate data indicates coordinates of each point obtained by the LiDAR. Note, however, that these examples do not limit the first example embodiment. Note that, by converting the coordinate data obtained by the LiDAR, it is also possible to express a depth in the form of an image.

In the first example embodiment, the position of the target object is the position of the target object in a three-dimensional space, and is a concept including a translational position of the target object. The posture of the target object is the posture of the target object in the three-dimensional space, and is a concept including an orientation of the target object. Note, however, that what parameter is specifically used to express the position and the posture of the target object does not limit the first example embodiment.

For example, the position of the target object can be expressed by the position of the center of gravity of the target object (x, y, z), and the posture of the target object can be expressed by the orientation of the target object (roll, pitch, yaw). In this case, the position and the posture of the target object are expressed by six parameters (x, y, z, roll, pitch, and yaw). Note that x, y, and z denote the position (coordinates) of the target object in the three-dimensional space.

As illustrated in FIG. 1, the information processing apparatus 1 includes an obtaining section 11, an estimating section 12, and an extending section 13. The obtaining section 11, the estimating section 12, and the extending section 13 realize an obtaining means, an estimating means, and an extending means, respectively, in the first example embodiment.

The obtaining section 11 obtains the sensing data that has been obtained by the sensor of which the sensing range includes the target object therein. For example, the obtaining section 11 may obtain the sensing data outputted by the sensor or may alternatively receive the sensing data from another device via a communication interface.

The estimating section 12 derives the one or more candidate solutions to the position and the posture of the target object by a first estimating process in which the sensing data that has been obtained by the obtaining section 11 and the three-dimensional model are used. More specifically, for example, the estimating section 12 derives the one or more candidate solutions to the position and the posture of the target object in the three-dimensional space, with reference to (i) first two-dimensional data which has been obtained by a feature extracting process in which depth information is referred to and (ii) third two-dimensional data which has been obtained by mapping the three-dimensional model onto a two-dimensional space and carrying out a first feature extracting process. The estimating section 12 supplies, to the extending section 13, the derived one or more candidate solutions.

Note, here, that the first feature extracting process is a process of referring to depth information and extracting one or more features included in the depth information. Examples of the first feature extracting process include a process of extracting an edge of a target object with use of an edge extraction filter. With this configuration, it is possible to carry out such an edge extracting process with respect to the depth information. It is therefore possible for the information processing apparatus 1 to suitably extract a feature of the target object.

The extending section 13 extends the three-dimensional model with respect to each of the one or more candidate solutions. Extension of the three-dimensional model includes, for example, fixing the length of an edge to be added to the three-dimensional model. A relationship between the one or more candidate solutions and the three-dimensional model is, for example, as follows. That is, for a single candidate solution which has been derived by the estimating section 12 and which is to a position and a posture of the target object, a single three-dimensional model which has the position and the posture related to the single candidate solution is specified. Alternatively, it may be expressed that the estimating section 12 is configured to derive, as the one or more candidate solutions to the position and the posture of the target object, one or more three-dimensional models each having an estimated position and an estimated posture.

For example, the extending section 13 extends the three-dimensional model so that a degree of obviousness of the three-dimensional model is improved. The degree of obviousness can also be expressed as a degree of visibility or a degree of discriminability of the three-dimensional model. The degree of obviousness may be, for example, evaluated on a pixel-by-pixel basis.

The estimating section 12 also estimates the position and the posture of the target object by a second estimating process in which one or more extended three-dimensional models that have been obtained by the extending section 13 are used. For example, the estimating section 12 estimates the position and the posture of the target object in the three-dimensional space with use of the one or more candidate solutions which have been generated by the estimating section 12 and with reference to (i) second two-dimensional data which has been obtained by a second feature extracting process in which a captured image that has been supplied from the obtaining section 11 is referred to and (ii) one or more three-dimensional models. For example, the estimating section 12 estimates the position and the posture of the target object in the three-dimensional space, with use of the one or more candidate solutions which have been generated by the estimating section 12 and with reference to (i) the second two-dimensional data which has been obtained by the second feature extracting process in which the captured image is referred to and (ii) fourth two-dimensional data which has been obtained by mapping the one or more three-dimensional models onto a two-dimensional space and carrying out the second feature extracting process.

Note, here, that the second feature extracting process is a process of referring to a captured image and extracting one or more features included in the captured image. Examples of the second feature extracting process include a process of extracting an edge of a target object with use of an edge extraction filter. With this configuration, it is possible to carry out such an edge extracting process with respect to the captured image. It is therefore possible for the information processing apparatus 1 to suitably extract a feature of the target object.

The edge extraction filter used in the second feature extracting process may be the same as the edge extraction filter used in the first feature extracting process or may be alternatively different from the edge extraction filter used in the first feature extracting process. For example, the edge extraction filter used in the second feature extracting process may be a filter having a filter coefficient different from that of the edge extraction filter used in the first feature extracting process.

As has been described above, the information processing apparatus 1 according to the first example embodiment employs a configuration in which the information processing apparatus 1 includes: an obtaining section 11 which obtains sensing data that has been obtained by a sensor of which a sensing range includes a target object therein; an estimating section 12 which derives one or more candidate solutions to a position and a posture of the target object by a first estimating process in which the sensing data that has been obtained by the obtaining section 11 and a three-dimensional model are used; and an extending section 13 which extends the three-dimensional model with respect to each of the one or more candidate solutions, the estimating section 12 estimating the position and the posture of the target object by a second estimating process in which one or more extended three-dimensional models that have been obtained by the extending section 13 are used. Therefore, in the information processing apparatus 1 according to the first example embodiment, it is possible to estimate the position and the posture of a target object without preparing a large number of three-dimensional models.

(Flow of Information Processing Method S1)

Figure 2:
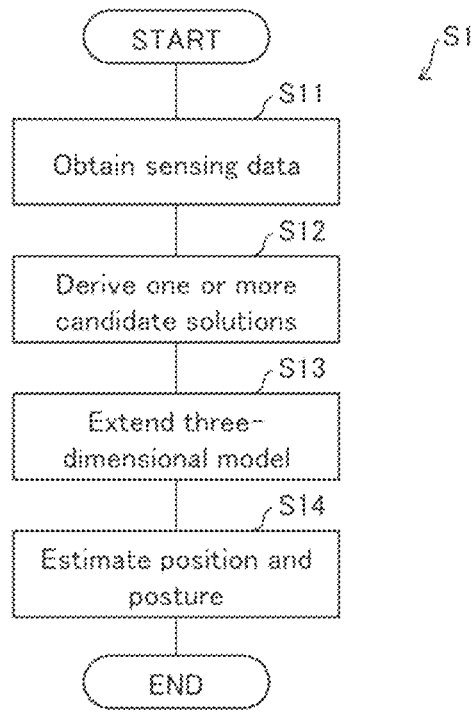
FIG. 2 is a flowchart illustrating a flow of an information processing method according to the first example embodiment.

A flow of an information processing method S1 according to the first example embodiment is described with reference to FIG. 2. FIG. 2 is a flowchart illustrating the flow of the information processing method S1 according to the first example embodiment.

In a step S11, the obtaining section 11 obtains sensing data that has been obtained by a sensor of which a sensing range includes a target object therein. In a step S12, the estimating section 12 derives one or more candidate solutions to the position and the posture of the target object by a first estimating process in which the sensing data and a three-dimensional model are used. In a step S13, the extending section 13 extends the three-dimensional model with respect to each of the one or more candidate solutions. In a step S14, the estimating section 12 estimates the position and the posture of the target object by a second estimating process in which one or more extended three-dimensional models are used.

As described above, the information processing method S1 according to the first example embodiment includes: obtaining sensing data that has been obtained by a sensor of which a sensing range includes a target object therein; deriving one or more candidate solutions to a position and a posture of the target object by a first estimating process in which the sensing data and a three-dimensional model are used; extending the three-dimensional model with respect to each of the one or more candidate solutions; and estimating the position and the posture of the target object by a second estimating process in which one or more extended three-dimensional models are used. Therefore, in the information processing method S1 according to the first example embodiment, the same effect as that brought about by the information processing apparatus 1 is brought about.

Second Example Embodiment

The following description will discuss, in detail, a second example embodiment of the present invention with reference to drawings. Note that constituent elements having the same functions as those described in the first example embodiment are denoted by the same reference numerals, and descriptions thereof will not be repeated.

(Configuration of Information Processing System 100)

Figure 3:
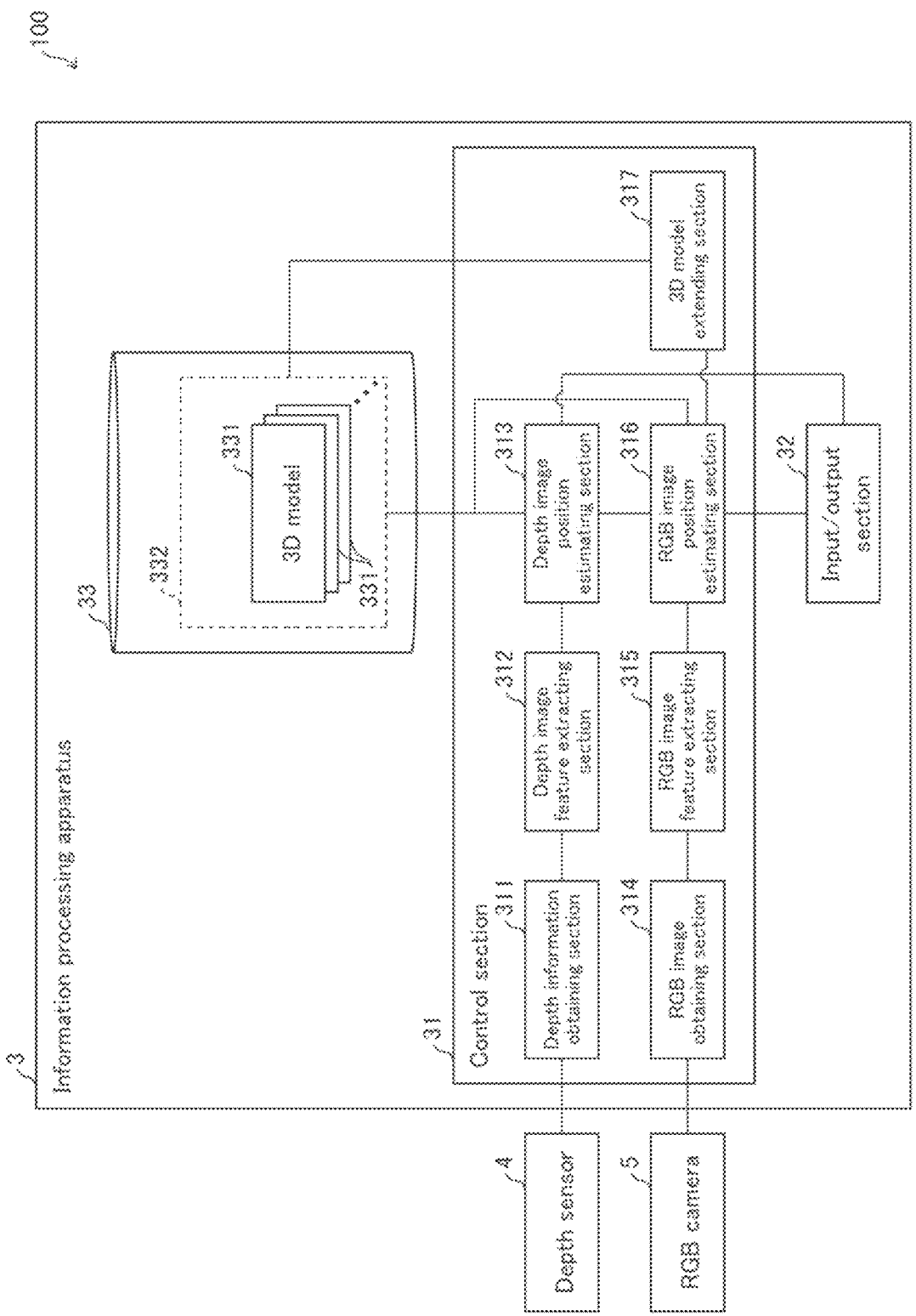
FIG. 3 is a block diagram illustrating a configuration of an information processing system according to a second example embodiment.

A configuration of an information processing system 100 according to the second example embodiment is described with reference to FIG. 3. FIG. 3 is a block diagram illustrating the configuration of the information processing system 100 according to the second example embodiment.

As illustrated in FIG. 3, the information processing system 100 includes an information processing apparatus 3, a depth sensor 4, and an RGB (Red, Green, Blue) camera 5. In the information processing system 100, the information processing apparatus 3 obtains depth information which has been obtained by the depth sensor 4 and which pertains to a target object included in a sensing range of the depth sensor 4, and obtains image information which has been obtained by the RGB camera 5 and which pertains to the target object included in an angle of view of the RGB camera 5. The information processing apparatus 3 then estimates the position and the posture of the target object with reference to the depth information and the image information which have been obtained. The target object, the depth information, and the position and the posture of the target object are as described in the first example embodiment.

The depth sensor 4 is a sensor which outputs depth information indicating a distance to an object included in a sensing range of the sensor. Examples of the depth sensor 4 include, but are not limited to, a stereo camera, which includes a plurality of cameras, and LiDAR, as described in the first example embodiment. Examples of the depth information include, but are not limited to, a depth image, which represents a depth, and coordinate data, which indicates coordinates of each point, as described in the first example embodiment.

The RGB camera 5 is a camera which includes an imaging sensor that captures an image of an object included in an angle of view of the imaging sensor and which outputs image data pertaining to the object included in the angle of view. The information processing system 100 is not limited to the RGB camera 5, and only needs to include a camera which outputs a multivalued image. For example, the information processing system 100 may include, instead of the RGB camera 5, a monochrome camera which outputs a black and white image that represents a captured image of an object with gradations from black to white. The depth sensor 4 and the RGB camera 5 may be separate from the information processing apparatus 3 or may be alternatively embedded in the information processing apparatus 3.

(Configuration of Information Processing Apparatus 3)

As illustrated in FIG. 3, the information processing apparatus 3 includes a control section 31, an input/output section 32, and a storage section 33. The input/output section 32 is a device which outputs data that is supplied from the control section 31 (described later). An example of a configuration in which the input/output section 32 outputs data is such that the input/output section 32 which is connected to a network (not illustrated) outputs data to another device that can communicate therewith via the network. Another example of the configuration in which the input/output section 32 outputs data is such that the input/output section 32 which is connected to a display (e.g., display panel) (not illustrated) outputs, to the display, data indicating an image to be displayed. These examples do not limit the second example embodiment. The input/output section 32 functions also as an acceptance means for accepting, from a user, an input about specification of an effective edge (described later). In order to exhibit this function, the input/output section 32 may include a configuration such as a keyboard, a mouse, and a touch panel.

In the storage section 33, various pieces of data to which the control section 31 (described later) refers are stored. For example, in the storage section 33, a 3D model group 332 is stored. The 3D model group 332 includes a plurality of 3D models (three-dimensional models) 331. Each 3D model 331 may be a model which is defined by meshes (e.g. triangle meshes) or surfaces used in 3D modeling, may be alternatively a model which explicitly includes data pertaining to an edge (contour) of the target object, or may be alternatively a model in which texture indicating a feature in an image of the target object is defined. In a case where each 3D model 331 is a model which explicitly includes data pertaining to an edge (contour) of the target object, it is possible to carry out an edge extracting process with respect to the 3D model 331. It is therefore possible for the information processing apparatus 3 to suitably extract a feature of the target object. Each 3D model 331 may include data pertaining to a vertex of the target object.

The 3D model group 332 includes an initial 3D model 331 and a 3D model 331 which has been obtained by extending the initial 3D model 331. Hereinafter, the initial 3D model 331 is referred to also as "initial 3D model 331_0". The initial 3D model 331_0 is, for example, a model obtained by modeling at least a part of a feature shared by various types of vessels. The initial 3D model 331_0 is, for example, a 3D model which includes six vertices and four edges and which represents a part of a vessel. Note, here, that the length of each edge of the initial 3D model 331_0 may be set to be rather short.

(Control Section 31)

The control section 31 controls constituent elements of the information processing apparatus 3. For example, the control section 31 obtains data from the storage section 33, and outputs data to the input/output section 32. As illustrated in FIG. 3, the control section 31 functions also as a depth information obtaining section 311, a depth image feature extracting section 312, a depth image position estimating section 313, an RGB image obtaining section 314, an RGB image feature extracting section 315, an RGB image position estimating section 316, and a 3D model extending section 317. The depth information obtaining section 311 and the RGB image obtaining section 314 realize an obtaining means in the second example embodiment. The 3D model extending section 317 realizes an extending means in the second example embodiment. The depth image position estimating section 313 and the RGB image position estimating section 316 realize an estimating means in the second example embodiment.

The depth information obtaining section 311 obtains the depth information that has been obtained by the depth sensor 4 of which the sensing range includes the target object therein. Even in a case where the target object is not present in the sensing range, the depth information obtaining section 311 obtains depth information which has been obtained by the depth sensor 4 and which pertains to the sensing range. The depth information obtaining section 311 supplies the obtained depth information to the depth image feature extracting section 312.

The depth image feature extracting section 312 carries out a first feature extracting process in which the depth information that has been supplied from the depth information obtaining section 311 is referred to, and generates first two-dimensional data. The depth image feature extracting section 312 supplies the generated first two-dimensional data to the depth image position estimating section 313. The first feature extracting process is as described in the first example embodiment. An example of a process carried out by the depth image feature extracting section 312 is described later with reference to another drawing.

The depth image position estimating section 313 generates one or more candidate solutions to at least one of the position and the posture of the target object in a three-dimensional space, with reference to the first two-dimensional data which has been supplied from the depth image feature extracting section 312 and a 3D model 331 which is stored in the storage section 33. The depth image position estimating section 313 supplies the generated one or more candidate solutions to the RGB image position estimating section 316. An example of a process carried out by the depth image position estimating section 313 is described later with reference to another drawing.

The RGB image obtaining section 314 obtains an RGB image (captured image) that has been obtained by the RGB camera 5 of which the angle of view includes the target object therein. The RGB image obtaining section 314 supplies the obtained RGB image to the RGB image feature extracting section 315.

The RGB image feature extracting section 315 carries out a second feature extracting process in which the RGB image that has been supplied from the RGB image obtaining section 314 is referred to, and generates second two-dimensional data. The RGB image feature extracting section 315 supplies the generated second two-dimensional data to the RGB image position estimating section 316. The second feature extracting process is as described in the first example embodiment. An example of a process carried out by the RGB image feature extracting section 315 is described later with reference to another drawing.

The RGB image position estimating section 316 derives one or more candidate solutions to the position and the posture of the target object in the three-dimensional space, with use of the one or more candidate solutions which have been supplied from the depth image position estimating section 313 and with reference to (i) the second two-dimensional data which has been supplied from the RGB image feature extracting section 315 and (ii) the 3D model 331 which is stored in the storage section 33. The RGB image position estimating section 316 supplies the derived one or more candidate solutions to the 3D model extending section 317.

The RGB image position estimating section 316 also estimates the position and the posture of the target object in the three-dimensional space, with use of the one or more candidate solutions which have been supplied from the depth image position estimating section 313 and with reference to (i) the second two-dimensional data which has been supplied from the RGB image feature extracting section 315 and (ii) the 3D model 331 which is stored in the storage section 33. The RGB image position estimating section 316 supplies, to the input/output section 32, the estimated position and the estimated posture of the target object in the three-dimensional space. An example of a process carried out by the RGB image position estimating section 316 is described later.

The 3D model extending section 317 extends the 3D model 331 with respect to each of the one or more candidate solutions which have been derived by the RGB image position estimating section 316 so that a degree of obviousness of the 3D model 331 is improved. The degree of obviousness is as described in the first example embodiment. An example of a process carried out by the 3D model extending section 317 is described later.

(Example of Method of Estimating Position and Posture of Target Object in Three-Dimensional Space)

Figure 4:
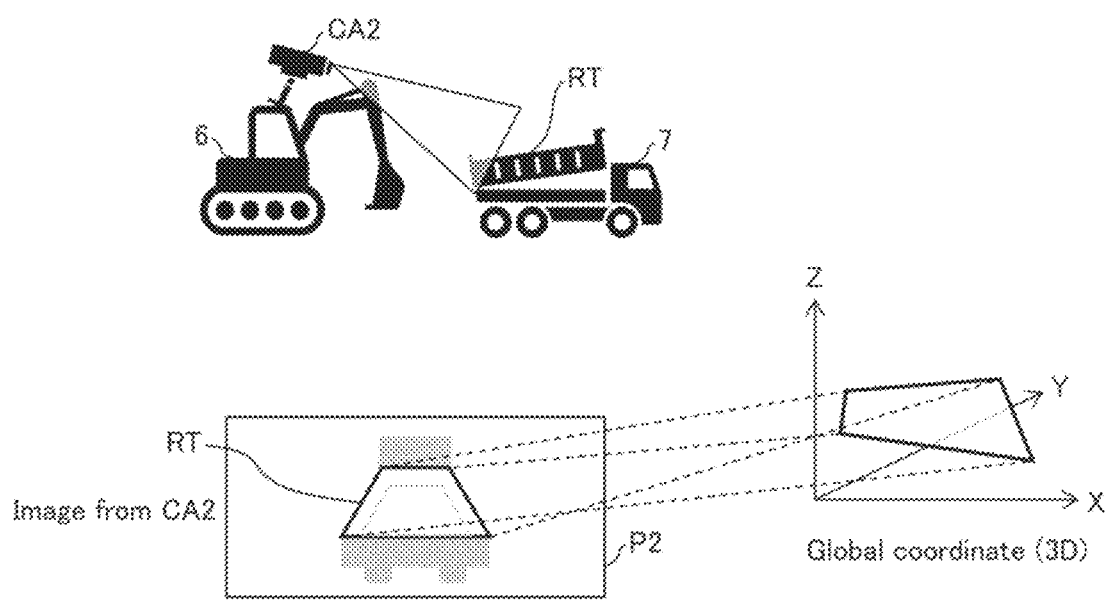
FIG. 4 is a drawing illustrating (i) a camera which captures an image of a vessel of a track that is a target object and (ii) the position of the camera, in the second example embodiment.

An example of a method in which the RGB image position estimating section 316 estimates the position and the posture of the target object in the three-dimensional space is described with reference to FIG. 4. FIG. 4 is a drawing illustrating the position of a camera CA2 which captures an image of a target object RT and the method in which the RGB image position estimating section 316 according to the second example embodiment estimates the position and the posture of the target object in the three-dimensional space. The camera CA2 illustrated in FIG. 4 is an example of the RGB camera 5 according to the second example embodiment.

In an example illustrated in FIG. 4, the camera CA2 is disposed on an upper part of a backhoe 6, and captures an image of the target object RT which is a vessel of a dump truck 7. In a case where the camera CA2 captures the image of the target object RT, the camera CA2 outputs an image P2. The RGB image position estimating section 316 calculates coordinates of the target object RT on a global coordinate (the position and the posture of the target object RT in a three-dimensional space), which correspond to the position of the target object RT included in the image P2, by moving and rotating a 3D model 331 on the basis of a positional parameter. Note, here, that the positional parameter expresses a position and a posture which the target object RT can take. An example of the positional parameter is described later with reference to another drawing.

(Flow of Processes Carried Out by Information Processing Apparatus 3)

Figure 5:
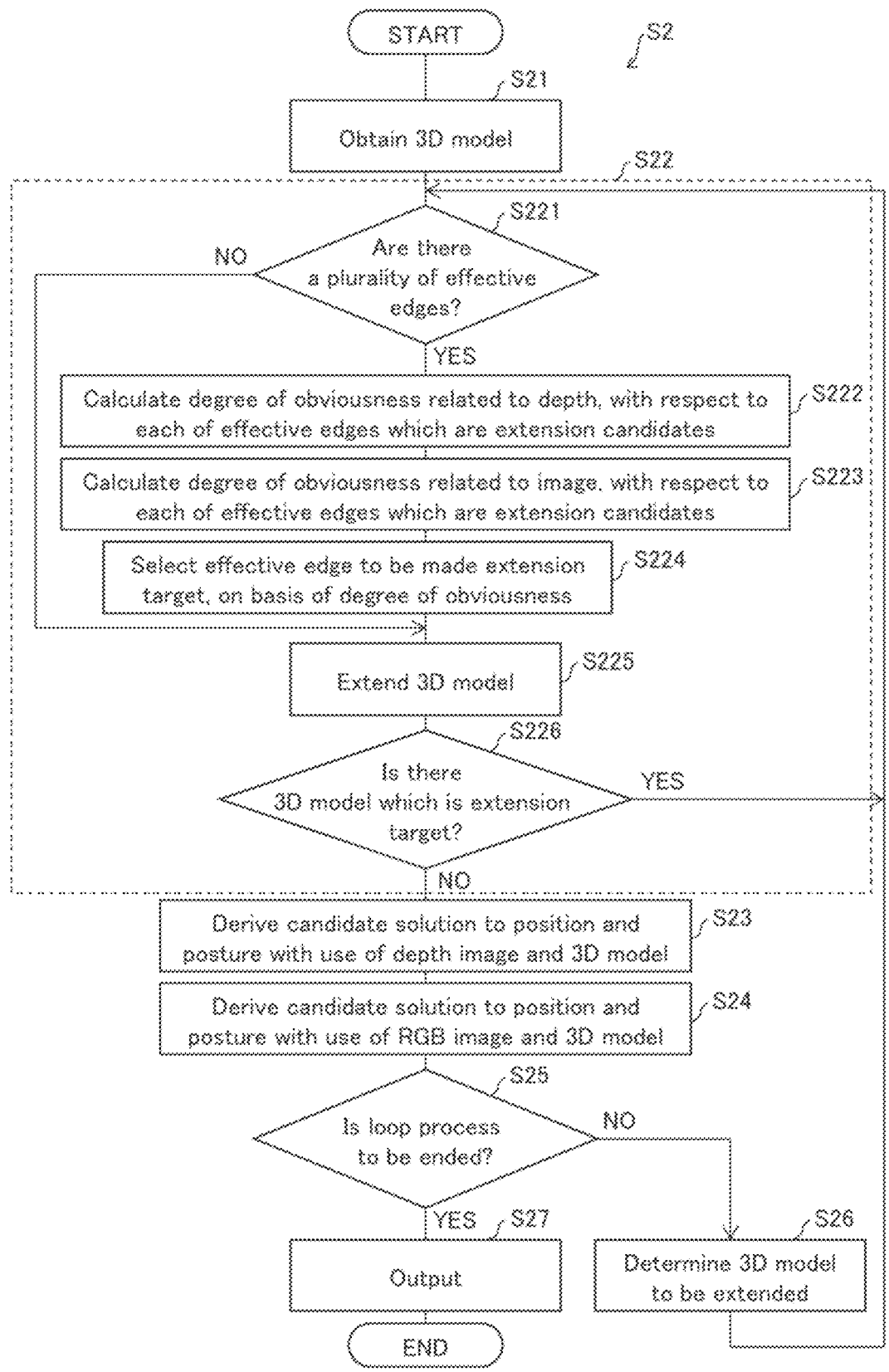
FIG. 5 is a flowchart illustrating a flow of processes carried out by an information processing apparatus according to the second example embodiment.
Figure 6:
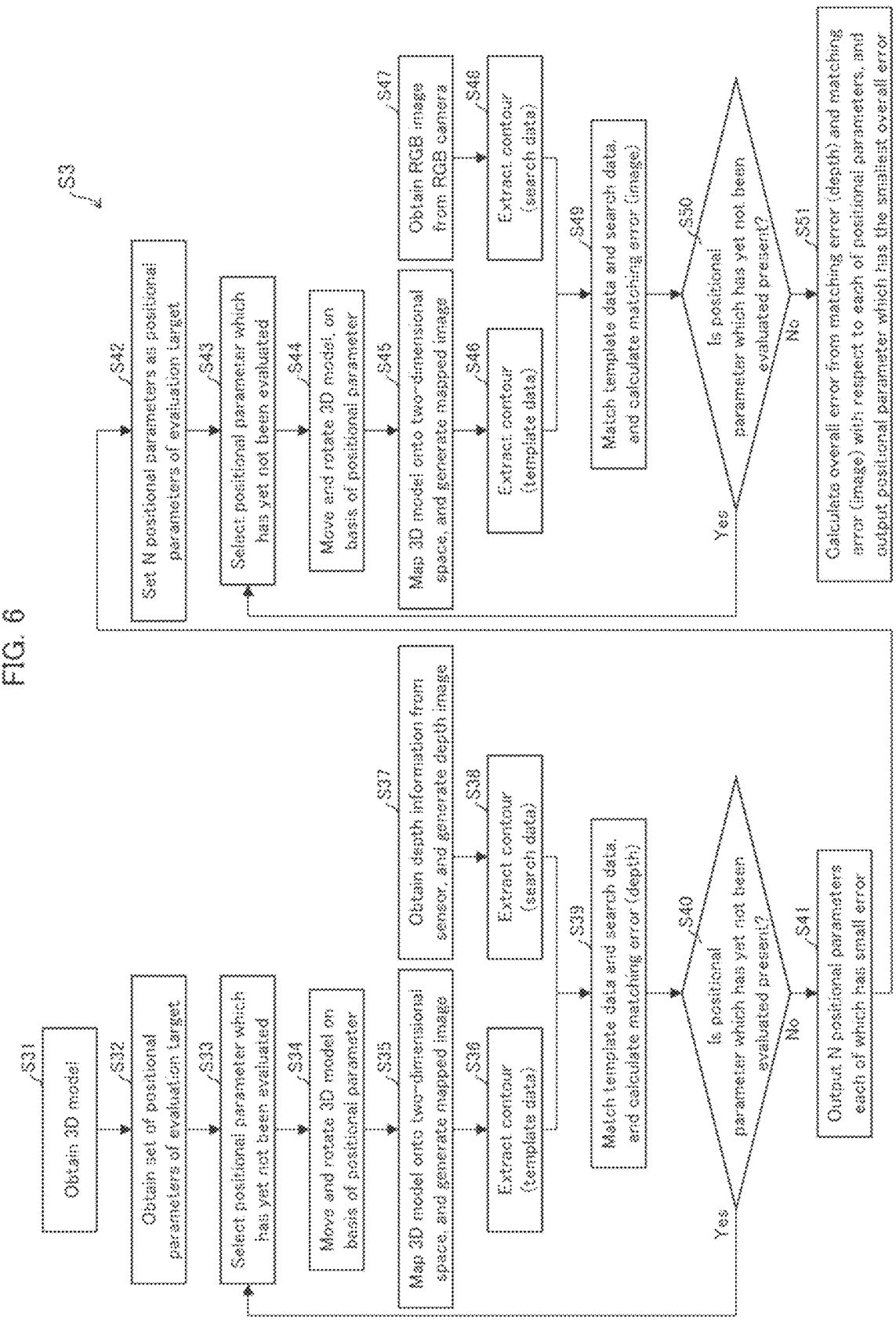
FIG. 6 is a flowchart illustrating a flow of processes carried out by the information processing apparatus according to the second example embodiment.
Figure 7:
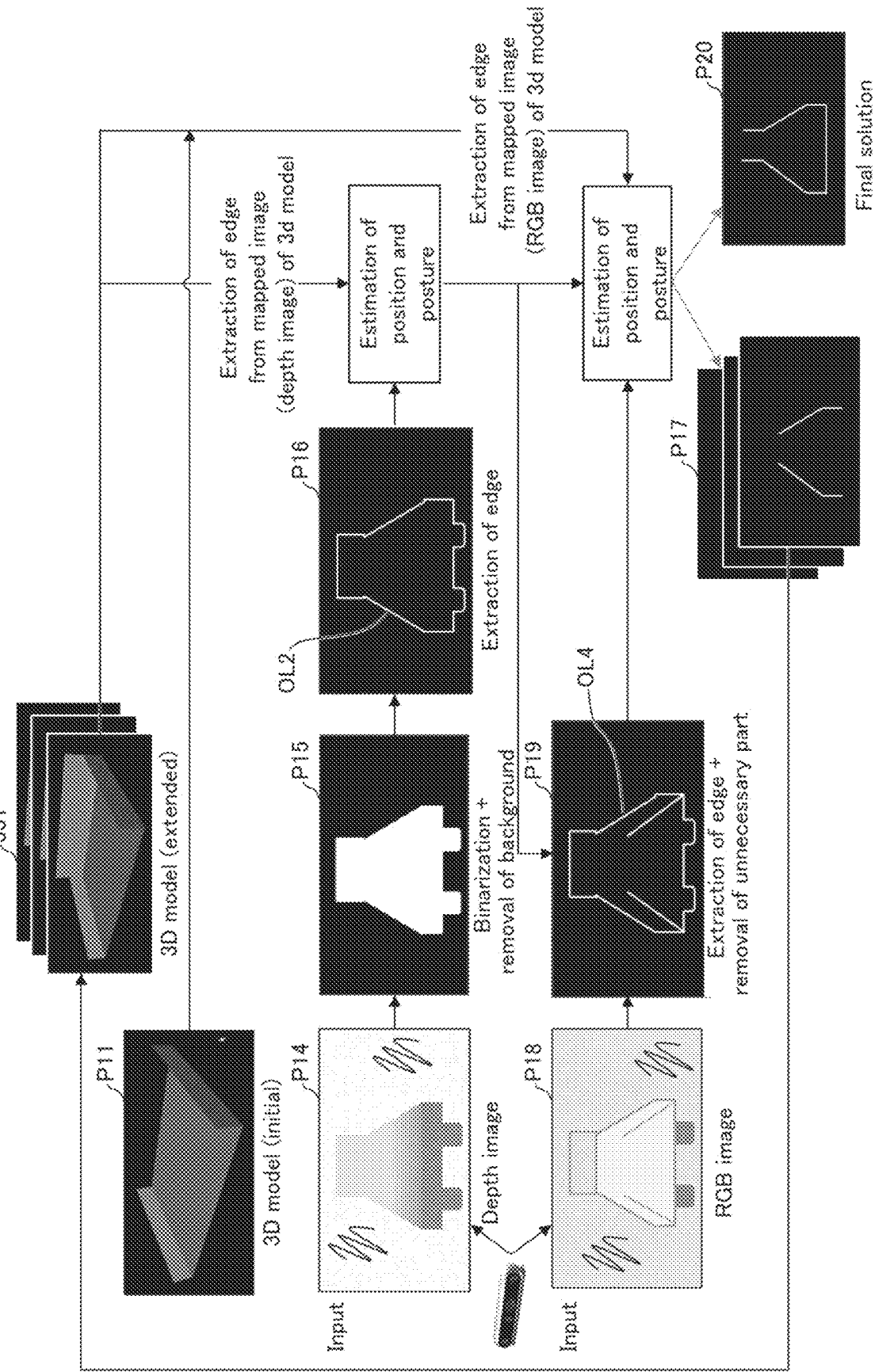
FIG. 7 is a drawing illustrating examples of images which are referred to and generated in processes carried out by the information processing apparatus according to the second example embodiment.

A flow of processes carried out by the information processing apparatus 3 is described with reference to FIGS. 5 to 7. FIGS. 5 and 6 are each a flowchart illustrating an example of the flow of the processes carried out by the information processing apparatus 3 according to the second example embodiment. FIG. 7 is a drawing illustrating examples of images which are referred to and generated in the processes carried out by the information processing apparatus 3 according to the second example embodiment. In an example illustrated in FIG. 7, a vessel of a dump truck is described as an example of a target object.

(Step S21)

In a step S21 illustrated in FIG. 5, the control section 31 obtains one or more 3D models 331. The one or more 3D models 331 obtained by the control section 31 are each an initial 3D model 331_0 which has yet not been extended by the 3D model extending section 317. The information processing apparatus 3 stores the obtained one or more 3D models 331_0 in the storage section 33.

A 3D model image P11 of the vessel illustrated in FIG. 7 is an image showing an initial 3D model 331_0 of the vessel, which is the target object. In the example illustrated in FIG. 7, the initial 3D model 331_0 includes data pertaining to an edge of the vessel.

(Step S22)

In a step S22, the 3D model extending section 317 extends the one or more 3D models 331 which have been obtained in the step S21 or one or more 3D models 331 which have been determined in a step S26 (described later).

In this example process, a 3D model 331 includes a plurality of vertices and one or more edges, and the one or more edges include at least one of:

(i) a fixed edge which is related to at least one of a depth and an image and which has a fixed length;

(ii) an effective edge which is related to at least one of the depth and the image and which has an unfixed length, and (iii) an unfixed edge which is an extension candidate.

Note, here, that the effective edge is, for example, an edge connected to the fixed edge. The effective edge is an example of an extension candidate in the 3D model 331. Further, in this example process, an initial 3D model 331_0 includes at least one fixed edge or at least one effective edge.

Further, the 3D model 331 may include an invalid edge. Note, here, that the invalid edge is an edge which is not used to estimate the position and the posture of the target object, and is, for example, an edge which is not obvious in a depth image or an RGB image.

The step S22 includes steps S221 to S226. The 3D model extending section 317 carries out processes in the steps S221 to S226 with respect to each of the one or more 3D models 331. In the steps S221 to S226, the 3D model extending section 317 extends each of the one or more 3D models 331 by selecting, from among a plurality of effective edges included in the each of the one or more 3D models 331, an effective edge to be made an extension target and fixing the length of the selected effective edge.

(Step S221)

First, in the step S221, the 3D model extending section 317 determines whether a 3D model 331 which is an extension target includes a plurality of effective edges which are extension candidates. In a case where the 3D model 331 includes a plurality of effective edges ("YES" in the step S221), the 3D model extending section 317 proceeds to the process in the step S222. In a case where the 3D model 331 includes a single effective edge ("NO" in the step S221), the 3D model extending section 317 skips the processes in the steps S222 to S224, and proceeds to the process in the step S225. That is, in a case where the 3D model 331 which is an extension target includes a plurality of effective edges, the 3D model extending section 317 selects, from among the plurality of effective edges, an effective edge to be made an extension target, by carrying out the processes in the steps S222 to S224 below. In a case where the 3D model 331 which is an extension target includes a single effective edge, the 3D model extending section 317 carries out an extending process in the step S225 with respect to the single effective edge, without carrying out the processes in the steps S222 to S224.

Note, here, that the "plurality of effective edges included in the each of the one or more 3D models 331" correspond to a "plurality of extension candidates" in this specification. In other words, the number of the "plurality of effective edges included in the each of the one or more 3D models 331" corresponds to the number of the "plurality of extension candidates" in this specification.

(Steps S222 and S223)

In the steps S222 and S223, the 3D model extending section 317 calculates a first degree of obviousness and a second degree of obviousness, respectively, of the 3D model 331. The first degree of obviousness is a degree of obviousness related to a depth. The second degree of obviousness is a degree of obviousness related to an image. In the step S222, the 3D model extending section 317 calculates the first degree of obviousness, which is a degree of obviousness related to the depth, with respect to each of the plurality of effective edges included in the 3D model 331. In the step S223, the 3D model extending section 317 calculates the second degree of obviousness, which is a degree of obviousness related to the image, with respect to each of the plurality of effective edges included in the 3D model 331. In other words, in the steps S222 and S223, the 3D model extending section 317 calculates the first degree of obviousness and the second degree of obviousness, respectively, with respect to each of a plurality of extension candidates (effective edges) in the 3D model 331. In the following description, in a case where it is not necessary to distinguish between the first degree of obviousness and the second degree of obviousness, the first degree of obviousness and the second degree of obviousness are referred to simply as "degree of obviousness". A specific example of a method of calculating the degree of obviousness is described later with reference to another drawing.

(Step S224)

In the step S224, the 3D model extending section 317 selects an effective edge to be made an extension target, on the basis of the degree of obviousness calculated with respect to each of the plurality of effective edges which are extension candidates. Note, here, that the 3D model extending section 317 may select a single effective edge as an extension target or may alternatively select a plurality of effective edges as extension targets. More specifically, for example, the 3D model extending section 317 selects an extension candidate which has the highest integrated degree of obviousness, which is obtained by integrating the first degree of obviousness and the second degree of obviousness. Note, here, that the 3D model extending section 317 uses, for example, the sum of the first degree of obviousness and the second degree of obviousness as the integrated degree of obviousness.

More specifically, for example, the 3D model extending section 317 calculates, with respect to each of the plurality of effective edges included in the 3D model 331, the integrated degree of obviousness in the case of promoting, to an effective edge(s), one or more unfixed edges which are connected to the each of the plurality of effective edges. Then, the 3D model extending section 317 selects, from among the plurality of effective edges, an effective edge which has the highest integrated degree of obviousness as a result of calculation.

(Step S225)

In the step S225, the 3D model extending section 317 extends the 3D model 331 so that the degree of obviousness of the 3D model 331 is improved. More specifically, the information processing apparatus 3 extends the 3D model 331 so that the integrated degree of obviousness, which is obtained by integrating the first degree of obviousness and the second degree of obviousness, is improved. More specifically, for example, the 3D model extending section 317 extends the 3D model 331 by promoting, to a fixed edge, the effective edge selected in the step S224 and promoting, to an effective edge(s), one or more unfixed edges which are connected to the selected effective edge.

In the step S225, in a case where the 3D model extending section 317 has selected a plurality of effective edges in the step S224, the 3D model extending section 317 carries out the extending process with respect to each of the plurality of effective edges which have been selected. For example, in a case where the 3D model extending section 317 has selected M (M is an integer of 2 or more) effective edges in the step S224, the 3D model extending section 317 carries out the extending process with respect to each of the M effective edges. In this case, the 3D model extending section 317 generates M 3D models 331 as extended 3D models which are obtained from the single 3D model 331.

(Step S226)

In the step S226, the 3D model extending section 317 determines whether there is still a 3D model 331 which has yet not been subjected to the extending process, that is, there is a 3D model 331 which is an extension target. In a case where there is still a 3D model 331 which has not been subjected to the extending process ("YES" in the step S226), the 3D model extending section 317 returns to the process in the step S221 and carries out the extending process with respect to the next 3D model 331. In a case where the extending process has been completed with respect to all 3D models 331 which are extension targets ("NO" in the step S226), the 3D model extending section 317 proceeds to a process in a step S23.

The 3D model extending section 317 carries out the processes in the steps S221 to S225 with respect to each of K (K is an integer of 1 or more) 3D model(s) 331 which is/are an extension target(s). For example, in a case where the 3D model extending section 317 extends each of the K 3D model(s) 331 in M variations, K×M 3D models 331 are obtained as extended 3D models 331.

(Step S23)

In the step S23, the depth image feature extracting section 312 and the depth image position estimating section 313 derive one or more candidate solutions to the position and the posture of the target object by a first estimating process in which depth information that has been obtained by the depth information obtaining section 311 and one or more 3D models 331 that have been extended by the 3D model extending section 317 are used. In so doing, for example, the depth image position estimating section 313 carries out the first estimating process with use of a fixed edge(s) and an effective edge(s) included in each of the one or more extended 3D models 331, and does not use an unfixed edge and an invalid edge in the estimating process. Details of the process in the step S23 are described later with reference to another drawing.

(Step S24)

In a step S24, the RGB image feature extracting section 315 and the RGB image position estimating section 316 carry out the first estimating process and a second estimating process with use of an RGB image which has been obtained by the RGB image obtaining section 314 and the one or more 3D models 331 which have been extended by the 3D model extending section 317. In the second example embodiment, the second estimating process carried out by the RGB image position estimating section 316 includes a process of deriving one or more candidate solutions to the position and the posture of the target object with use of the one or more extended 3D models 331. In so doing, for example, the RGB image position estimating section 316 carries out the first estimating process and the second estimating process with use of the fixed edge(s) and the effective edge(s) included in each of the one or more extended 3D models 331, and does not use an unfixed edge and an invalid edge in the estimating processes. Details of the process in the step S24 are described later with reference to another drawing.

(Step S25)

In a step S25, the RGB image position estimating section 316 determines whether a loop process is to be ended. For example, in a case where there is a remaining effective edge and a processing time is less than a threshold, the RGB image position estimating section 316 determines that the loop process is to be continued. Alternatively, for example, in a case where a difference between (i) a 3D model 331 which has the smallest difference from an image obtained from a depth image by edge extraction and/or an image obtained from the RGB image by edge extraction and (ii) a 3D model 331 which has the next smallest difference from the image obtained from the depth image by the edge extraction and/or the image obtained from the RGB image by the edge extraction is equal to or more than a given threshold, the RGB image position estimating section 316 may determine that the loop process is to be ended. Note, here, that the "difference from an image obtained from a depth image by edge extraction and/or an image obtained from the RGB image by edge extraction" indicates "at least one of a difference from an image obtained from a depth image by edge extraction and a difference from an image obtained from the RGB image by edge extraction". The "difference from an image obtained from a depth image by edge extraction and/or an image obtained from the RGB image by edge extraction" indicates, for example, (i) a first difference which is a difference between the image obtained from the depth image by the edge extraction and a map of a 3D model 331, (ii) a second difference which is a difference between the image obtained from the RGB image by the edge extraction and the map of the 3D model 331, or (iii) a statistic of the first difference and the second difference. In a case where a difference between two 3D models 331 is small, it is assumed that there is no sufficient distinction between the two 3D models 331. Therefore, by carrying out the loop process until the difference becomes large to some extent, it is possible to further increase accuracy of the estimating processes carried out with respect to the target object.

As another example of a determination method, for example, a function "distance(m*, m)" which defines a distance between a first 3D model **331_*m*1 and a second 3D model 331_*m*2 is defined, a 3D model 331 which has the smallest difference, among K 3D models 331**, is defined as m*, and then a difference between (i) a depth image and/or an RGB image and (ii) the 3D model 331 is defined as e(m*).

In this case, in a case where

"$e(m)-e(m^*)+\alpha \times distance(m^*,m)$"

is equal to or more than a given threshold, the RGB image position estimating section 316 may determine that the loop process is to be ended. Note, here, that α<0. According to this determination rule, "α×distance(m*, m)" is added so that a difference in position and posture between 3D models 331 is considered.

Examples of the function "distance(m*, m)" include distance(m1, m2)=α×|m1_translation−m2_translation|+β×|m1_rotation−m2_rotation|+γ×geo_distance(m1, m2).

Note, here, that m1_translation represents translation [x, y, z], and m1_rotation represents rotation [roll, pitch, yaw]. Further, for example, geo_distance is defined as follows. Note, here, that each V represents a function which returns a set of vertices included in a corresponding model.

$$geo\_distance(m1,m2)=\Sigma_{v1 \in V(m1)} \min_{v2 \in V(m2)} |v1-v2|$$

In a case where it is determined, in the step S25, that the loop process is to be ended ("YES" in the step S25), the RGB image position estimating section 316 proceeds to a process in a step S27. In a case where it is determined that the loop process is not to be ended ("NO" in the step S25), the RGB image position estimating section 316 proceeds to a process in the step S26.

(Step S26)

In the step S26, the 3D model extending section 317 determines a 3D model 331 to be extended, on the basis of the one or more candidate solutions which have been derived by the RGB image position estimating section 316. That is, the 3D model extending section 317 determines, as an extension target, a 3D model 331 which corresponds to at least a part of the one or more candidate solutions which have been derived by the RGB image position estimating section 316. For example, the 3D model extending section 317 selects K (K is a natural number of 1 or more) candidate solution(s) which has/have a small error, and determines, as an extension target(s), a 3D model(s) 331 corresponding to the selected solution(s).

For example, in a case where M (M is the number of variations in the extending process) 3D models 331 are generated, as extended 3D models, with respect to each of K 3D model(s) 331, K×M extended 3D models 331 are obtained. In this case, in the step S23, K×M candidate solutions are obtained by the depth image position estimating section 313 deriving a candidate solution group of the position and the posture of the target object with use of the K×M extended 3D models 331. In the step S26, the 3D model extending section 317 selects, from among a group of the K×M candidate solutions, K candidate solution(s) which has/have a small error, and carries out the extending process in the step S225 with respect to K 3D model(s) 331 corresponding to the selected K candidate solution(s).

After completing the process in the step S26, the 3D model extending section 317 returns to the process in the step S22, and carries out the extending process again with respect to the 3D model 331. That is, the control section 31 repeatedly carries out the processes in the steps S22 to S26 a plurality of times. In other words, the control section 31 repeats, a plurality of times, the extending process, which is carried out by the 3D model extending section 317, and the second estimating process, which is carried out by the RGB image position estimating section 316.

(Step S27)

In the step S27, the control section 31 selects the one candidate solution or at least one of the candidate solutions which have been derived by the RGB image position estimating section 316, and outputs the selected at least one to the input/output section 32.

(Example of Deriving Process of Deriving Candidate Solution Group)

Next, specific examples of the processes in the steps S23 and S24 illustrated in FIG. 5 are described with reference to FIG. 6. A flowchart illustrated in FIG. 6 is a flowchart illustrating examples of the processes in the steps S23 and S24 illustrated in FIG. 5. In FIG. 6, the information processing method S3 includes steps S31 to S51.

(Step S31)

In the step S31, the control section 31 obtains a 3D model 331. The 3D model 331 which is obtained by the control section 31 in the step S31 includes a 3D model 331 which has been extended by the 3D model extending section 317 in the step S22 illustrated in FIG. 5.

(Step S32)

In the step S32, the depth image position estimating section 313 obtains a set of positional parameters of the target object, which is an evaluation target. As described above, a positional parameter expresses a position and a posture which the target object can take. The set of positional parameters of the target object is, for example, a set of positions and postures (a set of positional parameters) which the vessel can take.

(Steps S33 and S34)

In the step S33, the depth image position estimating section 313 selects a single positional parameter which has yet not been evaluated, from among the set of positional parameters each of which indicates a position and a posture of the vessel. In the step S34, the depth image position estimating section 313 moves and rotates the 3D model 331, which is stored in the storage section 33, on the basis of the selected positional parameter.

(Step S35)

In the step S35, the depth image position estimating section 313 maps, onto a two-dimensional space, the 3D model 331 which has been moved and rotated, and generates a mapped image. The mapped image generated by the depth image position estimating section 313 is an image which shows depth information pertaining to the 3D model 331.

(Step S36)

In the step S36, the depth image position estimating section 313 extracts a contour (edge) of the target object in the mapped image. For example, the depth image position estimating section 313 extracts the contour, which is a feature of the target object, by applying a first feature extracting process to the mapped image, and generates third two-dimensional data indicating the contour. The third two-dimensional data which has been generated by the depth image position estimating section 313 is referred to also as "template data".

(Step S37)

In the step S37, the depth information obtaining section 311 obtains the depth information that has been obtained by the depth sensor 4 of which the sensing range includes the target object therein. The depth information obtaining section 311 then supplies the obtained depth information to the depth image feature extracting section 312.

The depth image feature extracting section 312 generates a depth image with reference to the depth information which has been supplied from the depth information obtaining section 311. For example, the depth image feature extracting section 312 obtains the depth information which has been obtained in a case where the target object is included in the sensing range and the depth information which has been obtained in a case where the target object is not included in the sensing range, and then generates a depth image which includes the target object and a depth image which is an image in a case where the target object is not present.

For example, the depth image feature extracting section 312 generates a depth image P14 and a background depth image (not illustrated). The depth image P14 is a depth image of the target object RT included in the sensing range, and is a recognition target. The background depth image is a depth image in a case where the target object RT is not present in the sensing range.

(Step S38)

In the step S38, the depth image feature extracting section 312 refers to the depth images, and extracts the contour of the target object. Data obtained by the depth image feature extracting section 312 extracting the contour of the target object is first two-dimensional data, and is also referred to as "depth edge" or "search data".

In the example illustrated in FIG. 7, the depth image feature extracting section 312 first calculates a difference between the depth image P14, which is a recognition target, and the background depth image (not illustrated), and generates a difference image P15 which is difference information.

Next, the depth image feature extracting section 312 carries out the first feature extracting process with reference to the generated difference information, and extracts one or more features included in the difference image. With this configuration, the information processing apparatus 3 carries out a process of extracting (i) a target object included in depth information and (ii) a feature of the target object, with reference to the depth information which has a small amount of information. Therefore, it is possible to suppress a calculation cost and a calculation time.

In the example illustrated in FIG. 7, the depth image feature extracting section 312 uses an edge extraction filter with respect to the difference image P15 to generate an image P16 which shows an edge OL2 extracted from the difference image. The image P16 is first two-dimensional data (depth edge or search data). The depth image feature extracting section 312 supplies the first two-dimensional data to the depth image position estimating section 313.

Note, here, that the depth image feature extracting section 312 may carry out the first feature extracting process with reference to binarized difference information which has been obtained by applying a binarizing process to the difference information. With this configuration, since the information processing apparatus 3 refers to binarized difference information which is obtained by applying a binarizing process and which has a small amount of information, it is possible to suppress a calculation cost and a calculation time.

Processes in the steps S37 and S38 are each an example of a process carried out by the depth image feature extracting section 312. Note that the steps S37 and S38 may be carried out in parallel with the steps S31 to S36, may be alternatively carried out before the steps S31 to S36, or may be alternatively carried out after the steps S31 to S36.

(Step S39)

In the step S39, the depth image position estimating section 313 matches the template data (third two-dimensional data), which has been extracted in the step S36, and the search data (first two-dimensional data), which has been supplied from the depth image feature extracting section 312 in the step S38, and calculates a matching error. For example, the depth image position estimating section 313 calculates the matching error by a template matching process in which the third two-dimensional data and the first two-dimensional data are referred to.

Note, here, an example of the template matching process is Chamfer Matching, but does not limit the second example embodiment. The other examples are, but are not limited to, methods in which the depth image position estimating section 313 uses Perspective-n-Point (PnP), Iterative Closest Point (ICP), and Directional Chamfer Matching (DCM) to calculate the matching error.

In the example illustrated in FIG. 7, an image which has been obtained by superimposing the image P16, which is search data, and template data, which is applied to the image P16, on each other is shown as an image P17. The depth image position estimating section 313 calculates, as a matching error, an error between (i) the edge OL2 included in the image P16 and (ii) the template data. The error calculated by the depth image position estimating section 313 is referred to also as "matching error (depth)", because the error indicates a matching error obtained with use of the depth information.

(Step S40)

In the step S40, the depth image position estimating section 313 determines whether or not a positional parameter which has yet not been evaluated is present. In a case where it is determined, in the step S40, that a positional parameter which has yet not been evaluated is present ("YES" in the step S40), the depth image position estimating section 313 returns to the process in the step S33.

(Step S41)

In a case where it is determined, in the step S40, that a positional parameter which has yet not been evaluated is not present ("NO" in the step S40), the depth image position estimating section 313 selects, in the step S41, up to N positional parameter(s) which has/have a matching error (depth) that is equal to or less than a given threshold and that is smaller than those of the other positional parameters, and defines the N positional parameter(s) as N candidate solution(s). Note, here, that the depth image position estimating section 313 may select N positional parameter(s) which has/have a relatively small error, and define the N positional parameter(s) as N candidate solution(s). With this configuration, the information processing apparatus 3 generates one or more candidate solutions by a template matching process in which first two-dimensional data that is obtained with reference to depth information having a smaller amount of information than that of an RGB image is referred to. Therefore, it is possible to suppress a calculation cost and a calculation time. The depth image position estimating section 313 supplies the N candidate solution(s) to the RGB image position estimating section 316.

The steps S32 to S36 and S39 to S41 are each an example of a process carried out by the depth image position estimating section 313.

(Step S42)

In the step S42, in a case where the RGB image position estimating section 316 obtains the candidate solution(s), which is/are the N positional parameter(s), from the depth image position estimating section 313, the RGB image position estimating section 316 sets the candidate solution(s) as a positional parameter(s) of the evaluation target.

(Step S43)

In the step S43, the RGB image position estimating section 316 selects a single positional parameter which has yet not been evaluated, from among the N positional parameter(s).

(Step S44)

In the step S44, the RGB image position estimating section 316 moves and rotates the 3D model 331, which is stored in the storage section 33, on the basis of the selected positional parameter.

(Step S45)

In the step S45, the RGB image position estimating section 316 maps, onto a two-dimensional space, the 3D model 331 which has been moved and rotated, and generates a mapped image. The mapped image generated by the RGB image position estimating section 316 is an image which includes texture information pertaining to the 3D model 331.

(Step S46)

In the step S46, the RGB image position estimating section 316 extracts the contour of the target object in the mapped image. For example, the RGB image position estimating section 316 extracts the contour (edge) of the target object by applying a second feature extracting process to the mapped image, and generates fourth two-dimensional data indicating the contour. The contour which is extracted by the RGB image position estimating section 316 may be a rectangular contour. The fourth two-dimensional data which has been generated by the RGB image position estimating section 316 is referred to also as "template data".

(Step S47)

In the step S47, the RGB image obtaining section 314 obtains the RGB image which has been obtained by the RGB camera 5 and which is of the target object included in the angle of view. The RGB image obtaining section 314 supplies the obtained RGB image to the RGB image feature extracting section 315.

(Step S48)

In the step S48, the RGB image feature extracting section 315 refers to the RGB image which has been supplied from the RGB image obtaining section 314, carries out the second feature extracting process, and then generates second two-dimensional data.

In the example illustrated in FIG. 7, the RGB image feature extracting section 315 extracts, as a feature, a rectangular contour of the target object included in an RGB image P18. As a method of extracting a rectangle, a known method can be, for example, used. The RGB image feature extracting section 315 generates, as second two-dimensional data, an image P19 which includes an extracted contour OL4. The image P19 generated by the RGB image feature extracting section 315 is referred to also as "RGB edge" or "search data". The RGB image feature extracting section 315 supplies the generated second two-dimensional data to the RGB image position estimating section 316.

A process in the step S48 is an example of a process carried out by the RGB image feature extracting section 315. Note that the steps S47 and S48 may be carried out in parallel with the steps S42 to S46, may be alternatively carried out before the steps S42 to S46, or may be alternatively carried out after the steps S42 to S46.

(Step S49)

In the step S49, the RGB image position estimating section 316 matches the template data (fourth two-dimensional data), which has been extracted in the step S46, and the search data (second two-dimensional data), which has been supplied from the RGB image feature extracting section 315 in the step S48, and calculates a matching error. For example, the RGB image position estimating section 316 calculates the matching error by a template matching process in which the fourth two-dimensional data and the second two-dimensional data are referred to. Note, here, an example of the template matching process is Chamfer Matching, but does not limit the second example embodiment. The other examples are, but are not limited to, methods in which the RGB image position estimating section 316 uses PnP, ICP, and DCM to calculate the matching error.

In the example illustrated in FIG. 7, an image which has been obtained by superimposing the image P19, which is search data, and template data, which is applied to the image P19, on each other is shown as an image P20. The RGB image position estimating section 316 calculates, as a matching error, an error between (i) the edge OL4 included in the image P19 and (ii) the template data. The error calculated by the RGB image position estimating section 316 is referred to also as "matching error (image)", because the error indicates a matching error obtained with use of an RGB image (image).

(Step S50)

In the step S50, the RGB image position estimating section 316 determines whether or not a positional parameter which has yet not been evaluated is present. In a case where it is determined, in the step S50, that a positional parameter which has yet not been evaluated is present ("YES" in the step S50), the RGB image position estimating section 316 returns to the process in the step S43.

(Step S51)

In the step S51, the RGB image position estimating section 316 (i) calculates an overall error from the matching error (depth) and the matching error (image) each of which has been calculated with respect to each of the positional parameters, (ii) selects a positional parameter which has the smallest overall error, and (iii) defines the positional parameter as a candidate solution. With this configuration, the information processing apparatus 3 derives a candidate solution to the position and the posture of a target object in a three-dimensional space by a template matching process in which second two-dimensional data that is obtained with reference to an RGB image having a larger amount of information than that of depth information is referred to. Therefore, it is possible to suitably derive a candidate solution to the position and the posture of the target object. The RGB image position estimating section 316 supplies the selected parameter to the input/output section 32.

In the example illustrated in FIG. 7, images P17 are shown which represent respective three candidate solutions corresponding to respective three templates that differ from each other in position and posture of a single 3D model 331. In a case where the 3D model extending section 317 extends, in the step S22 illustrated in FIG. 5, a 3D model 331 with respect to each of the three candidate solutions corresponding to the respective images P17, three 3D models 331 are obtained as extended 3D models 331.

For example, the RGB image position estimating section 316 can calculate an overall error e with use of the following expression (1), but this does not limit the second example embodiment.

$$e = wd \times ed + wi \times ei \quad (1)$$

Variables in the expression (1) represent the following.
wd: weighting parameter
wi: weighting parameter
ed: matching error (depth)
ei: matching error (image)

That is, the RGB image position estimating section 316 uses, as the overall error e, the sum of (i) the product of the matching error (depth) ed, which has been calculated in the step S39 by the depth image position estimating section 313, and the weighting parameter wd and (ii) the product of the matching error (image) ei, which has been calculated in the step S49 by the RGB image position estimating section 316, and the weighting parameter wi.

As another example, the RGB image position estimating section 316 can also calculate the overall error e with use of the following equation (2).

$$e = \beta d \times \exp(\alpha d \times ed) + \beta i \times \exp(\alpha i \times ei) \quad (2)$$

Variables in the expression (2) represent the following.
$\beta d$: weighting parameter
$\beta i$: weighting parameter
$\alpha d$: parameter
$\alpha i$: parameter
ed: matching error (depth)
ei: matching error (image)

That is, the RGB image position estimating section 316 first calculates an exponential of the product of the matching error (depth) ed, which has been calculated in the step S39 by the depth image position estimating section 313, and the parameter ad. Subsequently, the RGB image position estimating section 316 calculates the product (value d) of a value thus calculated and the weighting parameter Pd.

Next, the RGB image position estimating section 316 calculates an exponential of the product of the matching error (image) ei, which has been calculated in the step S49 by the RGB image position estimating section 316, and the parameter αi. Subsequently, the RGB image position estimating section 316 calculates the product (value i) of a value thus calculated and the weighting parameter βi.

Then, the RGB image position estimating section 316 uses, as the overall error e, the sum of the value d and the value i.

Note, here, that the RGB image position estimating section 316 may apply, to the RGB image or the second two-dimensional data, a data deleting process of deleting, from the RGB image or the second two-dimensional data, data which corresponds to an area that is a given distance or more away from a position(s) indicated by the N candidate solution(s). In this case, the RGB image position estimating section 316 may calculate at least one of the position and the posture of the target object in the three-dimensional space, with reference to the captured image or the second two-dimensional data which has been subjected to the data deleting process. With this configuration, the information processing apparatus 3 calculates at least one of the position and the posture of a target object in a three-dimensional space without processing data other than the target object. Therefore, it is possible to suppress a calculation cost and a calculation time.

The steps S49 to S51 are each an example of the process carried out by the RGB image position estimating section 316.

In the flowchart illustrated in FIG. 6, the information processing apparatus 3 may be configured such that (i) the order of carrying out the steps S37 to S39 and the steps S47 to S49 is reversed and (ii) furthermore, the RGB image position estimating section 316, in place of the depth image position estimating section 313, carries out the processes in the steps S32 to S36 and S39 to S41 and the depth image position estimating section 313, in place of the RGB image position estimating section 316, carries out the processes in the steps S42 to S46 and S49 to S51.

In other words, in the step S47, the RGB image obtaining section 314 obtains the captured image that has been obtained by the RGB camera 5 of which the angle of view includes the target object therein. In the step S39, the RGB image position estimating section 316 generates the one or more candidate solutions to at least one of the position and the posture of the target object in the three-dimensional space, with reference to (i) the second two-dimensional data which has been obtained by the second feature extracting process in which the captured image is referred to and (ii) the three-dimensional model.

Next, in the step S37, the depth information obtaining section 311 obtains the depth information that has been obtained by the depth sensor 4 of which the sensing range includes the target object therein. In the step S49, the depth image position estimating section 313 calculates at least one of the position and the posture of the target object in the three-dimensional space, with use of the one or more candidate solutions and with reference to (i) the first two-dimensional data which has been obtained by the first feature extracting process in which the depth information is referred to and (ii) the three-dimensional model.

(Example of Calculation of Degree of Obviousness)

Figure 8:
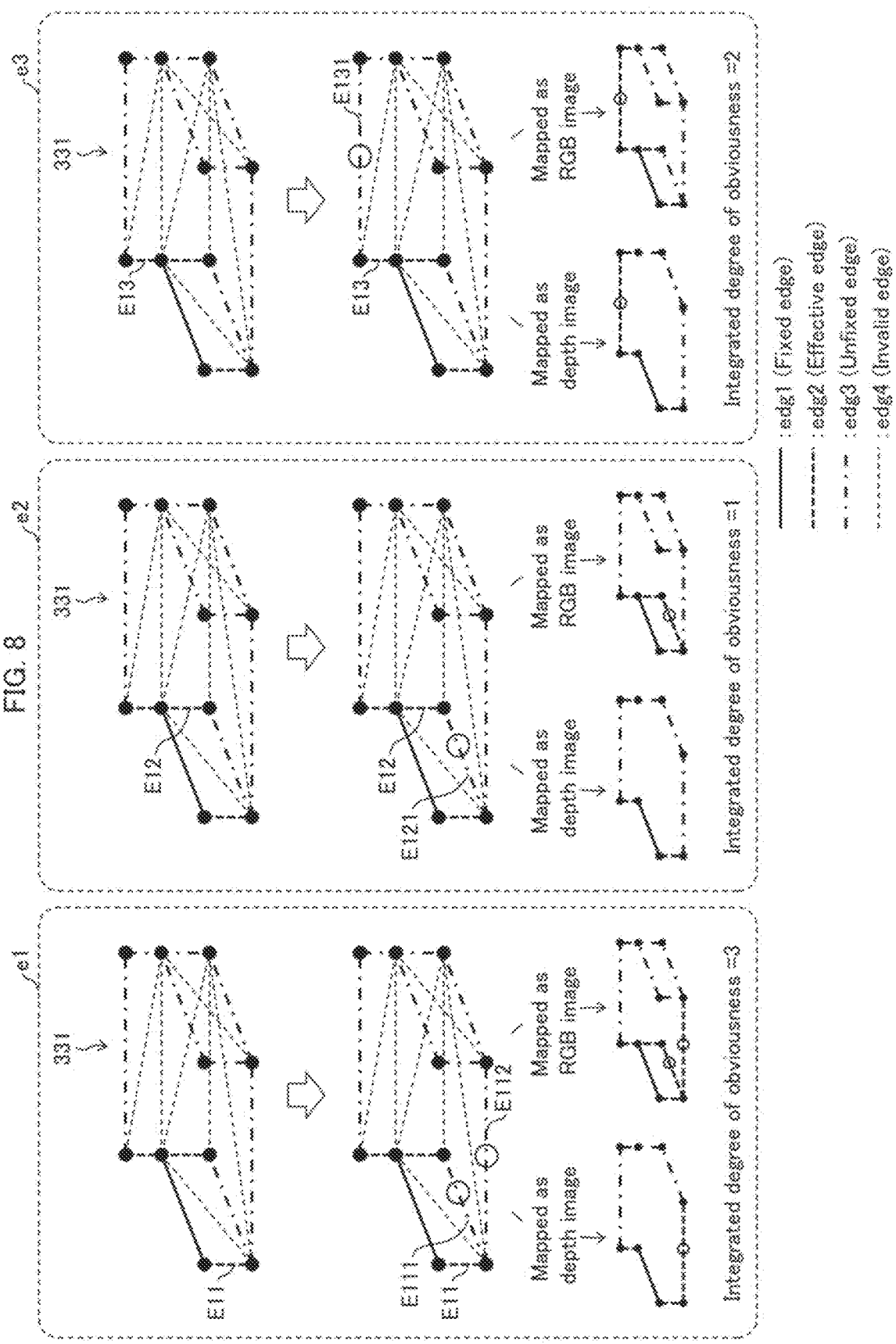
FIG. 8 is a drawing illustrating a specific example of a method of calculating a degree of obviousness.

A specific example of a process of calculating the degree of obviousness according to the second example embodiment is described with reference to FIG. 8. FIG. 8 is a drawing illustrating a specific example of a method of calculating a degree of obviousness. In the second example embodiment, the 3D model extending section 317 extends, step by step, a 3D model 331 by repeatedly carrying out the extending process, starting with an initial 3D model 331, as described above.

FIG. 8 illustrates, as an example, a case where an integrated degree of obviousness of a single 3D model 331 is calculated in three patterns e1 to e3. The 3D model 331 illustrated in FIG. 8 includes a single fixed edge edg1 and three effective edges E11 to E13 each of which is an effective edge edg2 connected to the fixed edge edg1. The 3D model extending section 317 calculates a first degree of obviousness, a second degree of obviousness, and the integrated degree of obviousness with respect to each of the three effective edges E11 to E13.

In this example, the first degree of obviousness with respect to the effective edge edg2 indicates the number of unfixed edges which are connected to the effective edge edg2 and which are obvious in a depth image. The second degree of obviousness with respect to the effective edge edg2 indicates the number of unfixed edges which are connected to the effective edge edg2 and which are obvious in an RGB image. The integrated degree of obviousness indicates the sum of the first degree of obviousness and the second degree of obviousness.

When calculating the first degree of obviousness, the 3D model extending section 317 determines whether the effective edge edg2 becomes a depth edge (contour part) in a case where the 3D model extending section 317 maps the 3D model 331 onto a two-dimensional space. Specifically, for example, the 3D model extending section 317 maps the 3D model 331 onto a two-dimensional space, and determines whether the effective edge edg2 becomes a contour part, in accordance with the relationship with the other mapped parts. Note, however, that a determining method is not limited to the above example, and another method may be employed. For example, the 3D model extending section 317 may make a determination in accordance with the relationship between each edge and the 3D model 331.

When calculating the second degree of obviousness, the 3D model extending section 317 determines whether the effective edge edg2 is extracted as an edge in a case where the 3D model extending section 317 maps, as an RGB image, the 3D model 331 onto a two-dimensional space. In so doing, the 3D model extending section 317 may determine that the effective edge edg2 which is sandwiched between two triangle surfaces is not obvious. Note, however, that a determining method is not limited to the above example, and another method may be employed.

Each of the patterns e1 to e3 illustrated in FIG. 8 indicates a specific example of a method of calculating the integrated degree of obviousness with respect to a corresponding one of the effective edges E11 to E13. In the pattern e1, two unfixed edges E111 and E112 are connected to the effective edge E11. In the depth image, the unfixed edge E112, out of the two unfixed edges E111 and E112, is present at a position at which the unfixed edge E112 can be extracted. In the RGB image, both of the unfixed edges E111 and E112 are present at positions at which both of the unfixed edges E111 and E112 can be extracted. Therefore, the first degree of obviousness with respect to the effective edge E11 is 1, and the second degree of obviousness with respect to the effective edge E11 is 2. The integrated degree of obviousness with respect to the effective edge E11 is 3.

In the pattern e2, a single unfixed edge E121 is connected to the effective edge E12. In the depth image, the unfixed edge E121 is not present at a position at which the unfixed edge E121 can be extracted. On the other hand, in the RGB image, the unfixed edge E121 is present at a position at which the unfixed edge E121 can be extracted. Therefore, the first degree of obviousness with respect to the effective edge E12 is 0, and the second degree of obviousness with respect to the effective edge E12 is 1. The integrated degree of obviousness with respect to the effective edge E12 is 1.

In the pattern e3, a single unfixed edge E131 is connected to the effective edge E13. In each of the depth image and the RGB image, the unfixed edge E131 is present at a position at which the unfixed edge E131 can be extracted. Therefore, the first degree of obviousness with respect to the effective edge E13 is 1, and the second degree of obviousness with respect to the effective edge E13 is 1. The integrated degree of obviousness with respect to the effective edge E13 is 2.

As described above, in the example illustrated in FIG. 8, the integrated degrees of obviousness with respect to the effective edges E11, E12, and E13 are "3", "1", and "2", respectively. In the step S224 illustrated in FIG. 5, the 3D model extending section 317 selects, as an extension target, the effective edge E12, which has the highest integrated degree of obviousness. The 3D model extending section 317 fixes the length of the selected effective edge E12 in the step S225, and promotes the effective edge E12 to a fixed edge edg1. The 3D model extending section 317 also promotes, to an effective edge edg2, an unfixed edge edg3 that is connected to the fixed edge edg1 of which the length has been fixed.

In the example illustrated in FIG. 8, the degree of obviousness with respect to the effective edge edg2 is defined as the number of unfixed edges which are connected to the effective edge edg2 and which are obvious in the depth image or the RGB image, but the degree of obviousness is not limited to the example described above. The degree of obviousness may be, for example, a value expressed by a percentage of a degree to which an unfixed edge is obvious. Alternatively, the degree of obviousness may be a value indicating a result of evaluating, on a pixel-by-pixel basis, a degree to which the unfixed edge is obvious.

The degree of obviousness is not limited to a value indicating a degree of visibility of the effective edge included in the 3D model 331, and may be another value. The degree of obviousness may be, for example, a value indicating a degree of visibility of the entire 3D model 331.

(Specific Example of Extension of 3D Model)

Figure 9:
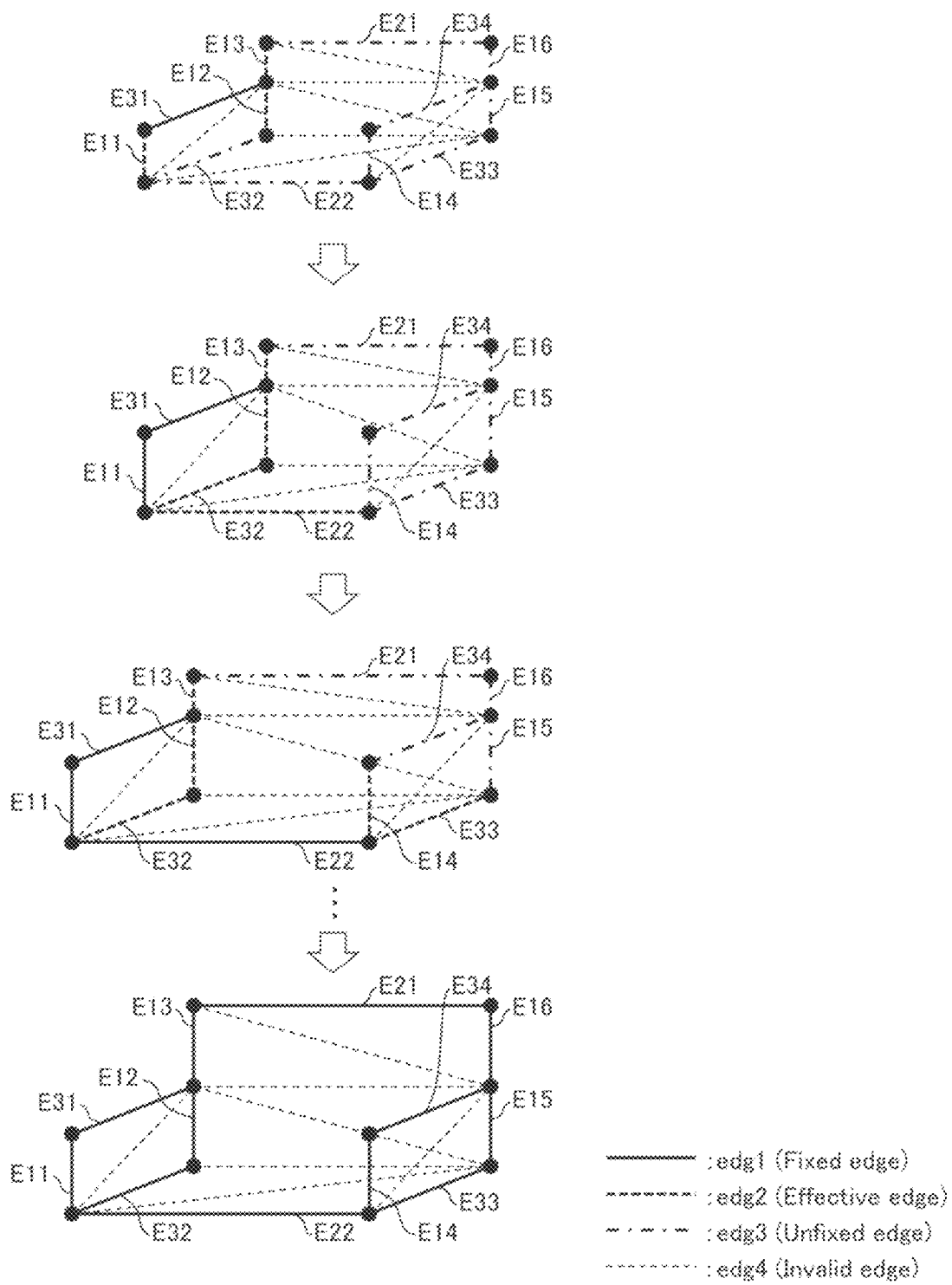
FIG. 9 is a drawing illustrating a specific example of extension of a 3D model.

FIG. 9 is a drawing illustrating a specific example of extension of a 3D model 331. In the example illustrated in FIG. 9, in the first extending process, the 3D model extending section 317 selects an effective edge E11 as an extension target, and then extends the 3D model 331. In so doing, the 3D model extending section 317 extends the 3D model 331 by promoting the effective edge E11, which is an extension target, to a fixed edge and promoting unfixed edges E22 and E32, which are connected to the effective edge E11, to effective edges.

In the second extending process, the 3D model extending section 317 selects the effective edge E22 as an extension target, and then extends the 3D model 331. Also in the second extending process, similarly to the first extending process, the 3D model extending section 317 extends the 3D model 331 by promoting the effective edge E22, which is an extension target, to a fixed edge and promoting unfixed edges E14 and E33, which are connected to the effective edge E22, to effective edges.

In the third extending process, the 3D model extending section 317 selects an effective edge E13 as an extension target, and then extends the 3D model 331. Also in the third extending process, similarly to the first and second extending processes, the 3D model extending section 317 extends the 3D model 331 by promoting the effective edge E13, which is an extension target, to a fixed edge and promoting an unfixed edge E21, which is connected to the selected effective edge E13, to an effective edge.

(Supplementary Remarks on Degree of Obviousness)

Figure 10:
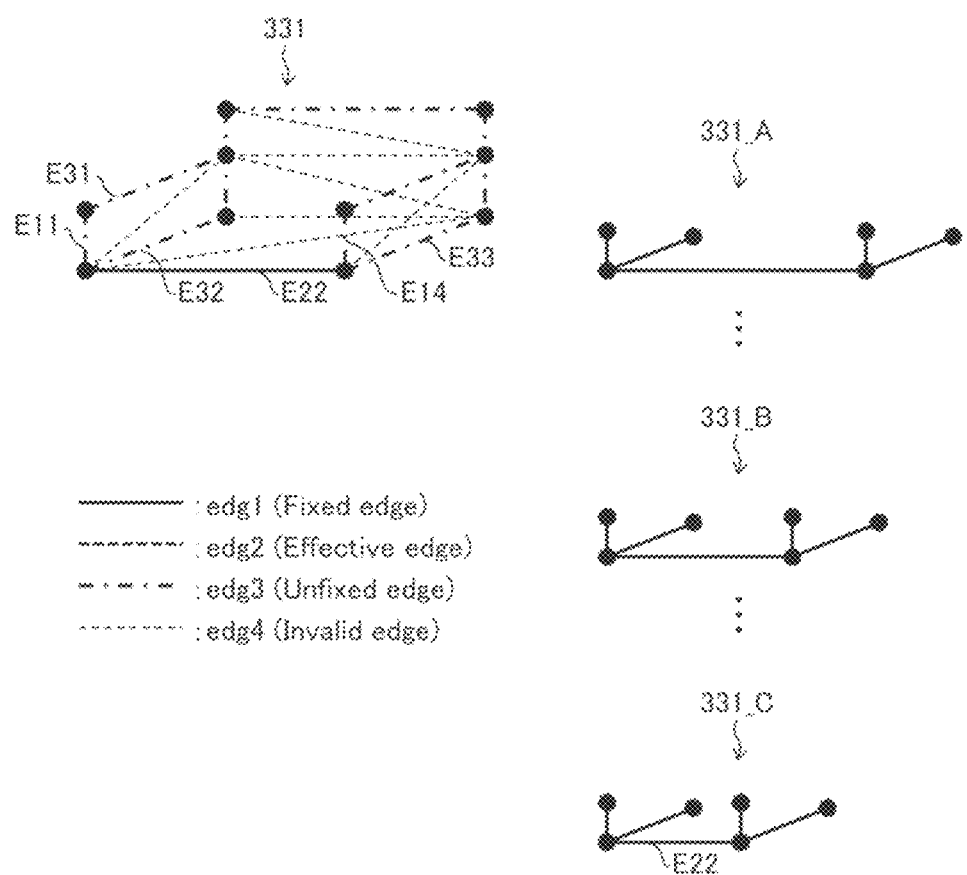
FIG. 10 is a drawing illustrating specific examples of 3D models used to derive one or more candidate solutions.

Supplementary remarks on the degree of obviousness are described with reference to FIGS. 10 to 16. FIG. 10 is a drawing illustrating specific examples of 3D models 331 which are used by the depth image position estimating section 313 and the RGB image position estimating section 316 (hereinafter, referred to as "depth image position estimating section 313 etc.") to derive one or more candidate solutions. In FIG. 10, 3D models 331_A, 331_B, and 331_C are models used to derive the one or more candidate solutions, and differ from each other in length of an edge E22. In the example illustrated in FIG. 10, the depth image position estimating section 313 etc. estimate positions and postures by variously changing the length of the edge E22, and select one or more of the positions and the postures each of which has a small error. In so doing, the depth image position estimating section 313 etc. carry out the estimating process while the lengths of edges E14 and E33, which are connected to the edge E22, are each regarded as the minimum length defined in advance. By using not only the edge E22 but also the edges which are connected to the edge E22 and of which the lengths are each regarded as the minimum length, it is possible to increase the accuracy of estimation of a position and a posture.

FIG. 11 is a drawing illustrating an example in which the 3D model extending section 317 has mapped, as a depth image, each of 3D models 331 onto a two-dimensional space. When comparing a 3D model 331 with a depth image, the 3D model extending section 317 maps the 3D model 331 onto a two-dimensional space, and determines whether each edge becomes a contour part. In a case where the 3D models 331_A, 331_B, and 331_C illustrated in FIG. 10 are each mapped, as a depth image, onto a two-dimensional space, an edge E32 and the edge E14 are each not extracted as an edge, as illustrated in FIG. 11.

In other words, in the examples illustrated in FIGS. 10 and 11, carrying out the estimating process with use of the edge E22 is synonymous with carrying out the estimating process with use of not only the edge E22 but also another/other edge(s) connected to the edge E22, as illustrated in FIG. 12. The amount of such another/other edge(s) which can be used in the estimating process (the number of edges, a proportion of a part of a single edge which part can be used, etc.) can be expressed also as the degree of obviousness according to the second example embodiment. The number of edges which can be used varies depending on which part of the 3D model 331 is used to carry out the estimating process. Therefore, in the estimating process, it is possible to increase the accuracy of estimation by selecting an extension target so that the number of edges which can be used increases (i.e., so that the degree of obviousness becomes higher).

Figure 13:
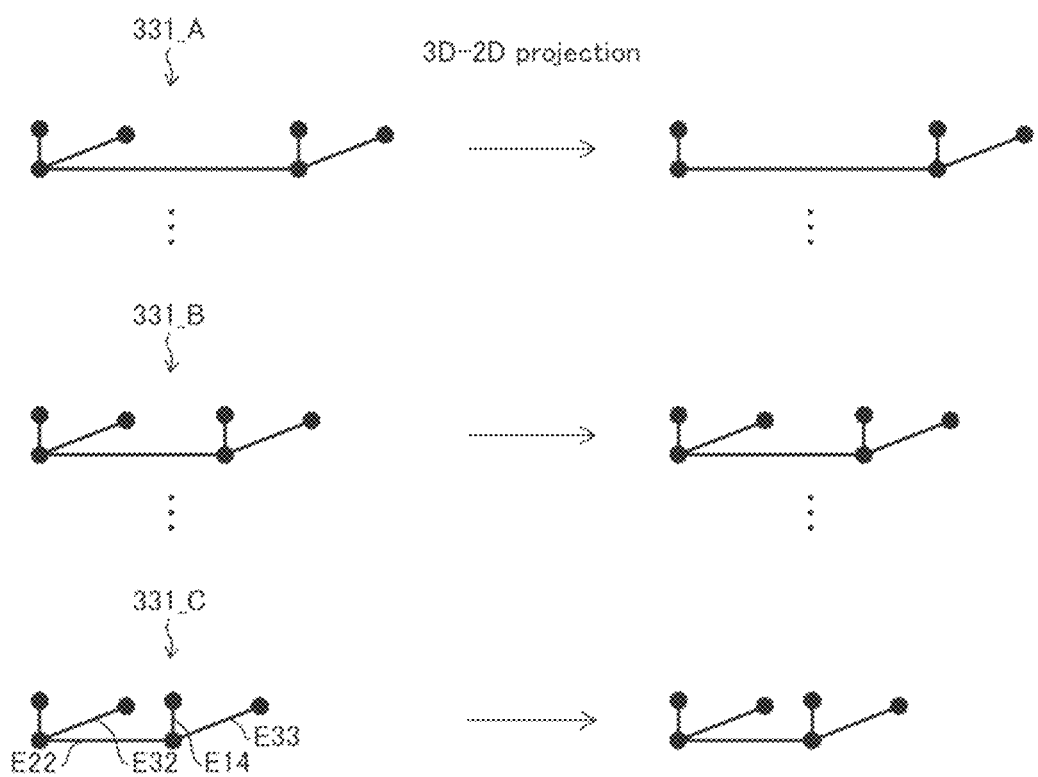
FIG. 13 is a drawing illustrating an example in which 3D models are each mapped onto a two-dimensional space.
Figure 14:
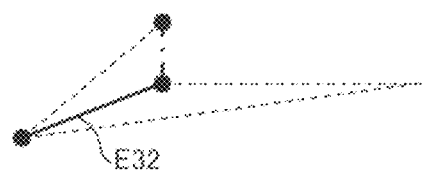
FIG. 14 is a drawing illustrating a method of calculating a second degree of obviousness.
Figure 15:
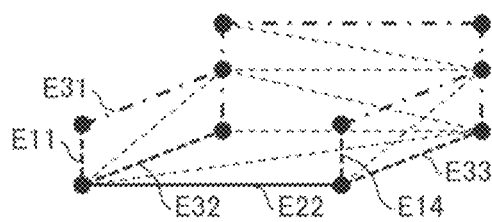
FIG. 15 is a drawing illustrating a method of selecting an effective edge to be made an extension target.

FIG. 13 is a drawing illustrating an example in which the 3D model extending section 317 has mapped, as an RGB image, each of 3D models 331 onto a two-dimensional space. When comparing a 3D model 331 with an RGB image, the 3D model extending section 317 maps the 3D model 331 onto a two-dimensional space, and determines whether each edge is extracted. In a case where the 3D models 331_A, 331_B, and 331_C illustrated in FIG. 10 are each mapped, as an RGB image, onto a two-dimensional space, the unfixed edges E32 and E14, each of which has not been extracted as an edge in the depth image, are each extracted as an edge.

The second degree of obviousness, which is a degree of obviousness related to an image of the 3D model 331, may be calculated in accordance with whether or not a part of the 3D model 331 is hidden in another part, or may be alternatively calculated by another method. For example, in an example illustrated in FIG. 14, the 3D model extending section 317 may determine that the edge E32, which is sandwiched between two triangular surfaces, is not obvious.

In the above example embodiment, as described above, the 3D model extending section 317 selects, from among effective edges connected to a fixed edge which already has a fixed length, an effective edge of which the length is next fixed (an effective edge to be made an extension target). For example, in an example illustrated in FIG. 15, in a case where the edge E22 is a fixed edge, the 3D model extending section 317 selects an extension target from among effective edges connected to the fixed edge E22. Thus, it is not possible to select an edge E31 as an extension target. This is because the length of an edge E11 has yet not been fixed and, therefore, the relative relationship between the edge E22 and the edge E31 varies depending on the length of the edge E11. In order to fix the length of an edge, it is necessary to select the edge which has a fixed relative relationship with another fixed edge, i.e., the edge which is connected to the fixed edge. In the example illustrated in FIG. 15, the 3D model extending section 317 evaluates the degree of obviousness in four patterns of the effective edges E11, E32, E14, and E33 (the number of effective edges).

(Variation of Method of Specifying Effective Edge)

In the above example embodiment, the 3D model extending section 317 promotes, to an effective edge, an unfixed edge which satisfies a given condition, among unfixed edges. However, a method of determining an effective edge is not limited to the example described in the above example embodiment. The 3D model extending section 317 may specify an effective edge by another method. For example, the 3D model extending section 317 may generate an acceptance screen via which the 3D model extending section 317 accepts, from a user, an input about specification of an effective edge, and specify the effective edge with reference to the input from the user.

Figure 16:
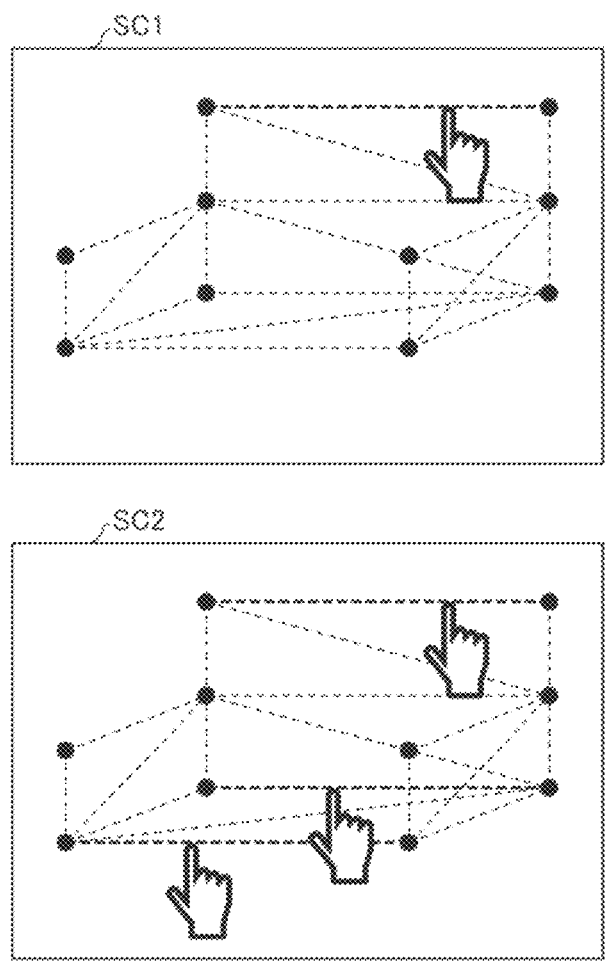
FIG. 16 is a drawing illustrating examples of an acceptance screen generated by a 3D model extending section.

FIG. 16 is a drawing illustrating examples of the acceptance screen generated by the 3D model extending section 317. In FIG. 16, the 3D model extending section 317 displays, on a touch panel or the like connected to the input/output section 32, an acceptance screen SC1, SC2, or the like for specifying an effective edge. The user conducts an operation of specifying an effective edge with use of an input device connected to the input/output section 32, and the 3D model extending section 317 specifies the effective edge with reference to an input which has been accepted by the input/output section 32 from the user.

(Grouping of Edges)

In a process of selecting an effective edge to be made an extension target, the 3D model extending section 317 may group edges included in a 3D model 331. It may be inefficient to extend, one by one, the edges included in the 3D model 331. Therefore, edges that are found to be the same in length may be grouped and handled as such. Note, however, that grouping is for imparting, as a constraint, the fact that the lengths of the edges are the same, and it is not always possible to fix the edges at the same time.

As a method of grouping edges, the 3D model extending section 317 may, for example, group and manage edges which are parallel or substantially parallel to each other, among the edges included in the 3D model 331. Alternatively, the 3D model extending section 317 may generate an acceptance screen via which the 3D model extending section 317 accepts, from a user, an input about selection of effective edges, and group and manage the effective edges with reference to the input from the user.

For example, in a 3D model 331 illustrated in FIG. 17, the 3D model extending section 317 groups edges E11, E12, E14, and E15, and groups edges E13 and E16. The 3D model extending section 317 also groups edges E21 and E22, and groups edges E31 to E34.

In this case, even in a case where the edge E22 which has been an effective edge is determined as a fixed edge, the unfixed edge E21 belonging to the same group as the edge E22 cannot be handled as a fixed edge and only the length of the edge which is simply an unfixed edge is fixed, because the position of the unfixed edge E21 varies depending on the length of another edge (e.g., edge E12, E13, E15, E16, or the like). In this case, when the edges E13 and E16 which are adjacent to the unfixed edge E21 become fixed edges, the unfixed edge E21 of which the length has been fixed is promoted to a fixed edge without the estimating process.

In a case where edges are grouped, the 3D model extending section 317 may select, as extension targets, a plurality of effective edges belonging to the same group, in a process of selecting, from among a plurality of effective edges, an effective edge to be made an extension target. For example, in an example illustrated in FIG. 18, in a case where the 3D model extending section 317 selects a group which includes edges E11, E12, E14, and E15, the 3D model extending section 317 can simultaneously consider two effective edges E31 and E34. For example, in a case where the 3D model extending section 317 selects a group which includes edges E31, E32, E33, and E34, the 3D model extending section 317 can simultaneously consider two effective edges E12 and E15.

(Example Effects of Information Processing Apparatus 3)

As has been described, the information processing apparatus 3 according to the second example embodiment extends, step by step, a 3D model 331 by carrying out the estimating process of estimating the position and the posture of a target object, starting with an initial 3D model 331 corresponding to at least a part of the target object. In this manner, the information processing apparatus 3 constructs a precise 3D model 331 stepwise. In so doing, in a case where, in order that a processing load is suppressed, extension of the model is ended at a point in time at which the model is extended to some extent, in what order the 3D model 331 is extended is important. This is because, in the estimating process of estimating the position and the posture, the 3D model 331 is mapped into 2D data indicating the 3D model 331 viewed from a certain viewpoint and, therefore, it is not meaningful to extend an invisible part (blind part). The information processing apparatus 3 according to the second example embodiment determines a part of the 3D model 331 which part is to be extended, after checking in advance whether the part to be extended is visible (obvious) when the 3D model 331 is mapped into the 2D data. This makes it possible to suppress the processing load of the estimating process of estimating the position and the posture of the target object.

The information processing apparatus 3 according to the second example embodiment derives one or more candidate solutions to the position and the posture of the target object with use of a depth image. In the depth image, it is possible to ignore a difference in texture (e.g., pattern in a vessel). Therefore, by the RGB image position estimating section 316 using an estimation result obtained by the depth image position estimating section 313, i.e., by using the depth image as a kind of filter, it is possible to reduce erroneous recognition in the RGB image position estimating section 316.

In the information processing apparatus 3 according to the second example embodiment, the 3D model extending section 317 employs a configuration in which the 3D model extending section 317 extends the 3D model 331 with respect to each of the one or more candidate solutions so that a degree of obviousness of the 3D model 331 is improved.

Therefore, in the information processing apparatus 3 according to the second example embodiment, it is possible to estimate the position and the posture of the target object more accurately, by estimating the position and the posture of the target object with use of the 3D model 331 which has been extended so that the degree of obviousness is improved.

In the information processing apparatus 3 according to the second example embodiment, the 3D model extending section 317 calculates a first degree of obviousness, which is a degree of obviousness related to a depth of the 3D model 331, and a second degree of obviousness, which is a degree of obviousness related to an image of the 3D model 331, and extends the 3D model 331 so that an integrated degree of obviousness, which is obtained by integrating the first degree of obviousness and the second degree of obviousness, is improved. In the information processing apparatus 3 according to the second example embodiment, by estimating the position and the posture of the target object with use of the 3D model 331 which has been extended in consideration of both the degree of obviousness related to the depth and the degree of obviousness related to the image, it is possible to estimate the position and the posture of the target object more accurately.

In the information processing apparatus 3 according to the second example embodiment, the 3D model extending section 317 calculates the first degree of obviousness and the second degree of obviousness with respect to each of a plurality of extension candidates of the 3D model 331, and selects an extension candidate which has the highest integrated degree of obviousness, which is obtained by integrating the first degree of obviousness and the second degree of obviousness. In the information processing apparatus 3 according to the second example embodiment, by selecting the extension candidate which has the highest integrated degree of obviousness and extending the 3D model 331, it is possible to estimate the position and the posture of the target object more accurately.

In the information processing apparatus 3 according to the second example embodiment, the 3D model extending section 317 uses, as the integrated degree of obviousness, the sum of the first degree of obviousness and the second degree of obviousness. In the information processing apparatus 3 according to the second example embodiment, by extending the 3D model 331 so that the sum of the first degree of obviousness and the second degree of obviousness is improved, it is possible to estimate the position and the posture of the target object more accurately.

In the information processing apparatus 3 according to the second example embodiment, the 3D model 331 includes a plurality of vertices and one or more edges, and the one or more edges include at least one of: (i) a fixed edge which is related to at least one of the depth and the image and which has a fixed length; (ii) an effective edge which is related to at least one of the depth and the image and which has an unfixed length; and (iii) an unfixed edge which is an extension candidate. In the information processing apparatus 3 according to the second example embodiment, by extending the 3D model 331 which includes a plurality of edges so that the degrees of obviousness related to the depth and the image are improved, it is possible to estimate the position and the posture of the target object more accurately with use of the 3D model 331 which includes the plurality of edges.

In the information processing apparatus 3 according to the second example embodiment, the 3D model extending section 317 calculates, with respect to each of the plurality of effective edges included in the 3D model 331, the integrated degree of obviousness in the case of promoting, to an effective edge(s), one or more unfixed edges which are connected to the each of the plurality of effective edges. Then, the 3D model extending section 317 selects, from among the plurality of effective edges, an effective edge which has the highest integrated degree of obviousness as a result of calculation. Thereafter, the 3D model extending section 317 extends the 3D model 331 by promoting the selected effective edge to a fixed edge and promoting, to an effective edge(s), one or more unfixed edges which are connected to the selected effective edge. In the information processing apparatus 3 according to the second example embodiment, by extending the 3D model 331 by fixing the length of an effective edge which has the highest integrated degree of obviousness, among the plurality of effective edges, it is possible to estimate the position and the posture of the target object more accurately with use of the three-dimensional model which includes the plurality of edges.

In the information processing apparatus 3 according to the second example embodiment, the 3D model extending section 317 generates an acceptance screen via which the 3D model extending section 317 accepts, from a user, an input about specification of an effective edge, and specifies the effective edge with reference to the input from the user. Thus, in the information processing apparatus 3 according to the second example embodiment, it is possible to estimate the position and the posture of the target object while reflecting more user's intention.

In the information processing apparatus 3 according to the second example embodiment, the 3D model extending section 317 generates an acceptance screen via which the 3D model extending section 317 accepts, from a user, an input about selection of a plurality of effective edges, and groups and manages the plurality of effective edges with reference to the input from the user. Thus, in the information processing apparatus 3 according to the second example embodiment, it is possible to estimate the position and the posture of the target object while reflecting more user's intention.

In the information processing apparatus 3 according to the second example embodiment, the second estimating process carried out by the depth image position estimating section 313 and the second estimating process carried out by the RGB image position estimating section 316 each include a process of deriving one or more candidate solutions to the position and the posture of the target object with use of one or more extended 3D models 331, and the information processing apparatus 3 includes the control section 31 which repeats, a plurality of times, (i) the extending process which is carried out by the 3D model extending section 317 and (ii) the second estimating process which is carried out by the depth image position estimating section 313 and/or the second estimating process which is carried out by the RGB image position estimating section 316. In the information processing apparatus 3 according to the second example embodiment, by repeating, a plurality of times, the extending process of extending the 3D model 331 and the second estimating process, it is possible to estimate the position and the posture of the target object more accurately with use of the 3D model 331.

[Software Implementation Example]

A part or all of the functions of each of the information processing apparatuses 1 and 3 and the information processing system 100 may be realized by hardware such as an integrated circuit (IC chip) or may be alternatively realized by software.

Figure 19:
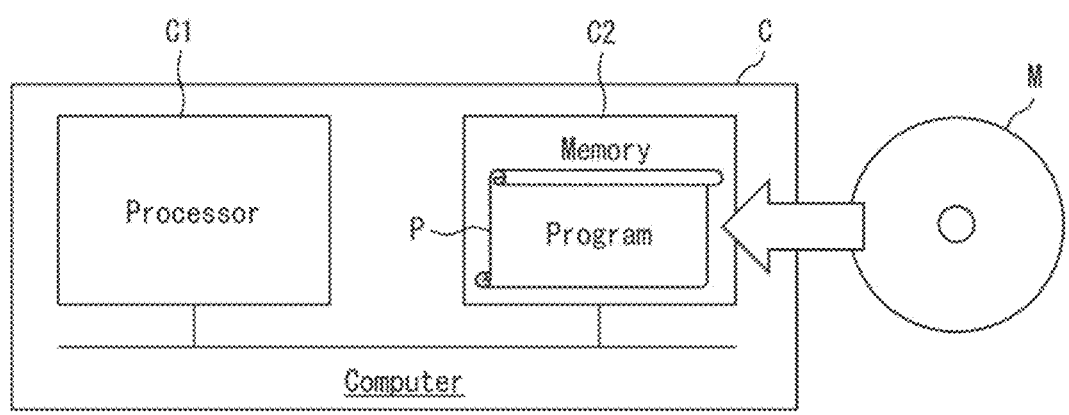
FIG. 19 is a block diagram illustrating an example of a hardware configuration of the information processing apparatus and the information processing system according to the example embodiments of the present invention.

In the latter case, each of the information processing apparatuses 1 and 3 and the information processing system 100 is realized by, for example, a computer which executes instructions of a program that is software realizing the functions. FIG. 19 illustrates an example of such a computer (hereinafter, referred to as "computer C"). The computer C includes at least one processor C1 and at least one memory C2. In the memory C2, a program P for causing the computer C to operate as each of the information processing apparatuses 1 and 3 and the information processing system 100 is recorded. In the computer C, the functions of each of the information processing apparatuses 1 and 3 and the information processing system 100 are realized by the processor C1 reading the program P from the memory C2 and executing the program P.

The processor C1 can be, for example, a central processing unit (CPU), a graphic processing unit (GPU), a digital signal processor (DSP), a micro processing unit (MPU), a floating point number processing unit (FPU), a physics processing unit (PPU), a microcontroller, or a combination thereof. The memory C2 can be, for example, a flash memory, a hard disk drive (HDD), a solid state drive (SSD), or a combination thereof.

Note that the computer C may further include a random access memory (RAM) in which the program P is loaded when executed and/or in which various kinds of data are temporarily stored. The computer C may further include a communication interface via which the computer C transmits and receives data to and from another device. The computer C may further include an input/output interface which connects the computer C to an input/output apparatus such as a keyboard, a mouse, a display, and a printer.

The program P can also be recorded in a non-transitory tangible recording medium M from which the computer C can read the program P. Such a recording medium M can be, for example, a tape, a disk, a card, a semiconductor memory, a programmable logic circuit, or the like. The computer C can acquire the program P via such a recording medium M. The program P can also be transmitted via a transmission medium. Such a transmission medium can be, for example, a communication network, a broadcast wave, or the like. The computer C can acquire the program P via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

The whole or part of the example embodiments disclosed above can be described as follows. Note, however, that the present invention is not limited to the following example aspects.

(Supplementary Note 1)

An information processing apparatus including: an obtaining means for obtaining sensing data that has been obtained by a sensor of which a sensing range includes a target object therein; an estimating means for deriving one or more candidate solutions to a position and a posture of the target object by a first estimating process in which the sensing data that has been obtained by the obtaining means and a three-dimensional model are used; and an extending means for extending the three-dimensional model with respect to each of the one or more candidate solutions, the estimating means estimating the position and the posture of the target object by a second estimating process in which one or more extended three-dimensional models that have been obtained by the extending means are used.

(Supplementary Note 2)

The information processing apparatus as described in Supplementary note 1, wherein the extending means extends the three-dimensional model with respect to the each of the one or more candidate solutions so that a degree of obviousness of the three-dimensional model is improved.

(Supplementary Note 3)

The information processing apparatus as described in Supplementary note 2, wherein the extending means calculates a first degree of obviousness which is a degree of obviousness related to a depth of the three-dimensional model and a second degree of obviousness which is a degree of obviousness related to an image of the three-dimensional model, and extends the three-dimensional model so that an integrated degree of obviousness which is obtained by integrating the first degree of obviousness and the second degree of obviousness is improved.

(Supplementary Note 4)

The information processing apparatus as described in Supplementary note 3, wherein the extending means calculates the first degree of obviousness and the second degree of obviousness with respect to each of a plurality of extension candidates in the three-dimensional model, and selects an extension candidate that has the highest integrated degree of obviousness, which is obtained by integrating the first degree of obviousness and the second degree of obviousness.

(Supplementary Note 5)

The information processing apparatus as described in Supplementary note 3 or 4, wherein the extending means uses, as the integrated degree of obviousness, a sum of the first degree of obviousness and the second degree of obviousness.

(Supplementary Note 6)

The information processing apparatus as described in any one of Supplementary notes 3 to 5, wherein the three-dimensional model includes a plurality of vertices and one or more edges, and the one or more edges include at least one of: a fixed edge which is related to at least one of the depth and the image and which has a fixed length; an effective edge which is related to at least one of the depth and the image and which has an unfixed length; and an unfixed edge which is an extension candidate.

(Supplementary Note 7)

The information processing apparatus as described in Supplementary note 6, wherein the extending means (i) calculates, with respect to each of a plurality of effective edges included in the three-dimensional model, the integrated degree of obviousness in a case of promoting, to an effective edge(s), one or more unfixed edges which are connected to the each of the plurality of effective edges, (ii) selects, from among the plurality of effective edges, an effective edge which has the highest integrated degree of obviousness as a result of calculation, and (iii) extends the three-dimensional model by promoting, to a fixed edge, the effective edge which has been selected and promoting, to an effective edge(s), one or more unfixed edges which are connected to the effective edge that has been selected.

(Supplementary Note 8)

The information processing apparatus as described in Supplementary note 6, wherein the extending means generates an acceptance screen via which the at least one processor accepts, from a user, an input about specification of the effective edge, and specifies the effective edge with reference to the input from the user.

(Supplementary Note 9)

The information processing apparatus as described in Supplementary note 6, wherein the extending means generates an acceptance screen via which the at least one processor accepts, from a user, an input about selection of a plurality of effective edges, and groups and manages the plurality of effective edges with reference to the input from the user.

(Supplementary Note 10)

The information processing apparatus as described in any one of Supplementary notes 1 to 9, wherein the second estimating process, which is carried out by the estimating means, includes a process of deriving one or more candidate solutions to the position and the posture of the target object with use of the one or more extended three-dimensional models, and the information processing apparatus includes a control means for repeating, a plurality of times, the extending process, which is carried out by the extending means, and the second estimating process, which is carried out by the estimating means.

(Supplementary Note 11)

An information processing method including: (a) obtaining sensing data that has been obtained by a sensor of which a sensing range includes a target object therein; (b) deriving one or more candidate solutions to a position and a posture of the target object by a first estimating process in which the sensing data and a three-dimensional model are used; (c) extending the three-dimensional model with respect to each of the one or more candidate solutions; and (d) estimating the position and the posture of the target object by a second estimating process in which one or more extended three-dimensional models are used.

(Supplementary Note 12)

A program for causing a computer to function as: an obtaining means for obtaining sensing data that has been obtained by a sensor of which a sensing range includes a target object therein; an estimating means for deriving one or more candidate solutions to a position and a posture of the target object by a first estimating process in which the sensing data that has been obtained by the obtaining means and a three-dimensional model are used; and an extending means for extending the three-dimensional model with respect to each of the one or more candidate solutions, the estimating means estimating the position and the posture of the target object by a second estimating process in which one or more extended three-dimensional models that have been obtained by the extending means are used.

[Additional Remark 3]

The whole or part of the example embodiments disclosed above can also be expressed as follows.

An information processing apparatus including: at least one processor, the at least one processor carrying out: an obtaining process of obtaining sensing data that has been obtained by a sensor of which a sensing range includes a target object therein; a deriving process of deriving one or more candidate solutions to a position and a posture of the target object by a first estimating process in which the sensing data that has been obtained in the obtaining process and a three-dimensional model are used; an extending process of extending the three-dimensional model with respect to each of the one or more candidate solutions; and a position estimating process of estimating the position and the posture of the target object by a second estimating process in which one or more extended three-dimensional models that have been obtained in the extending process are used.

Note that this information processing apparatus may further include a memory, and, in this memory, a program may be stored which is for causing the at least one processor to carry out the obtaining process, the deriving process, the extending process, and the position estimating process. Alternatively, this program may be recorded in a computer-readable non-transitory tangible recording medium.

REFERENCE SIGNS LIST

1, 3 Information processing apparatus
11 Obtaining section
12 Estimating section
13 Extending section
311 Depth information obtaining section
312 Depth image feature extracting section
313 Depth image position estimating section
314 RGB image obtaining section
315 RGB image feature extracting section
316 RGB image position estimating section
317 3D model extending section

The invention claimed is:

1. An information processing apparatus comprising:
at least one processor,
the at least one processor carrying out:
   an obtaining process of obtaining sensing data that has been obtained by a sensor of which a sensing range includes a target object therein;
   a first estimating process of deriving one or more candidate solutions to a position and a posture of the target object with use of the sensing data that has been obtained in the obtaining process and a three-dimensional model;
   an extending process of extending the three-dimensional model with respect to each of the one or more candidate solutions; and
   a second estimating process of estimating the position and the posture of the target object with use of one or more extended three-dimensional models that have been obtained in the extending process,
wherein in the extending process, the at least one processor calculates a first degree of obviousness which is a degree of obviousness related to a depth of the three-dimensional model and a second degree of obviousness which is a degree of obviousness related to an image of the three-dimensional model, and extends the three-dimensional model so that an integrated degree of obviousness which is obtained by integrating the first degree of obviousness and the second obviousness is improved.

2. The information processing apparatus as set forth in claim 1, wherein in the extending process, the at least one processor calculates the first degree of obviousness and the second degree of obviousness with respect to each of a plurality of extension candidates in the three-dimensional model, and selects an extension candidate that has the highest integrated degree of obviousness, which is obtained by integrating the first degree of obviousness and the second degree of obviousness.

3. The information processing apparatus as set forth in claim 1, wherein in the extending process, the at least one processor uses, as the integrated degree of obviousness, a sum of the first degree of obviousness and the second degree of obviousness.

4. The information processing apparatus as set forth in claim 1, wherein the three-dimensional model includes a plurality of vertices and one or more edges, and the one or more edges include at least one of:
- a fixed edge which is related to at least one of the depth and the image and which has a fixed length;
- an effective edge which is related to at least one of the depth and the image and which has an unfixed length; and
- an unfixed edge which is an extension candidate.

5. The information processing apparatus as set forth in claim 4, wherein in the extending process, the at least one processor (i) calculates, with respect to each of a plurality of effective edges included in the three-dimensional model, the integrated degree of obviousness in a case of promoting, to an effective edge(s), one or more unfixed edges which are connected to the each of the plurality of effective edges, (ii) selects, from among the plurality of effective edges, an effective edge which has the highest integrated degree of obviousness as a result of calculation, and (iii) extends the three-dimensional model by promoting, to a fixed edge, the effective edge which has been selected and promoting, to an effective edge(s), one or more unfixed edges which are connected to the effective edge that has been selected.

6. The information processing apparatus as set forth in claim 4, wherein in the extending process, the at least one processor generates an acceptance screen via which the at least one processor accepts, from a user, an input about specification of the effective edge, and specifies the effective edge with reference to the input from the user.

7. The information processing apparatus as set forth in claim 4, wherein in the extending process, the at least one processor generates an acceptance screen via which the at least one processor accepts, from a user, an input about selection of a plurality of effective edges, and groups and manages the plurality of effective edges with reference to the input from the user.

8. The information processing apparatus as set forth in claim 1, wherein
the second estimating process includes a process of deriving one or more candidate solutions to the position and the posture of the target object with use of the one or more extended three-dimensional models, and
the at least one processor repeats, a plurality of times, the extending process and the second estimating process.

9. An information processing method comprising:
(a) obtainingسensing data that has been obtained by a sensor of which a sensing range includes a target object therein;
(b) deriving one or more candidate solutions to a position and a posture of the target object by a first estimating process in which the sensing data and a three-dimensional model are used;
(c) extending the three-dimensional model with respect to each of the one or more candidate solutions; and
(d) estimating the position and the posture of the target object by a second estimating process in which one or more extended three-dimensional models are used, the processes (a) through (d) being carried out by at least one processor, wherein in the extending process, the at least one processor calculates a first degree of obviousness which is a degree of obviousness related to a depth of the three-dimensional model and a second degree of obviousness which is a degree of obviousness related to an image of the three-dimensional model, and extends the three-dimensional model so that an integrated degree of obviousness which is obtained by integrating the first degree of obviousness and the second obviousness is improved.

10. A non-transitory recording medium in which a program is recorded, the program causing a computer to carry out:
an obtaining process of obtaining sensing data that has been obtained by a sensor of which a sensing range includes a target object therein;
a first estimating process of deriving one or more candidate solutions to a position and a posture of the target object with use of the sensing data that has been obtained in the obtaining process and a three-dimensional model;
an extending process of extending the three-dimensional model with respect to each of the one or more candidate solutions; and
a second estimating process of estimating the position and the posture of the target object with use of one or more extended three-dimensional models that have been obtained in the extending process, wherein in the extending process, the computer calculates a first degree of obviousness which is a degree of obviousness related to a depth of the three-dimensional model and a second degree of obviousness which is a degree of obviousness related to an image of the three-dimensional model, and extends the three-dimensional model so that an integrated degree of obviousness which is obtained by integrating the first degree of obviousness and the second obviousness is improved.

\* \* \* \* \*